United States Patent
Annigeri et al.

(10) Patent No.: US 12,548,349 B1
(45) Date of Patent: Feb. 10, 2026

(54) VULNERABLE ROAD USER DETECTION

(71) Applicant: Samsara Inc., San Francisco, CA (US)

(72) Inventors: Rohit Annigeri, Santa Clara, CA (US); Sharan Srinivasan, Campbell, CA (US); William Nathan Hurst, Seattle, WA (US); Akshay Raj Dhamija, Campbell, CA (US); Shreyas Patil, Wilmington, CA (US); Kevin Lai, Redmond, WA (US); Paul Savastinuk, Bainbridge Island, WA (US); William Evan Welbourne, Seattle, WA (US); Abner Ayala Acevedo, Clarksville, TN (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 19/079,821

(22) Filed: Mar. 14, 2025

(51) Int. Cl.
| | |
|---|---|
| G06V 20/58 | (2022.01) |
| G06T 7/246 | (2017.01) |
| G06T 7/55 | (2017.01) |
| G06V 10/70 | (2022.01) |

(Continued)

(52) U.S. Cl.
CPC ............ *G06V 20/58* (2022.01); *G06T 7/246* (2017.01); *G06T 7/55* (2017.01); *G06V 10/70* (2022.01); *G06V 20/40* (2022.01); *G08G 1/166* (2013.01); *G06T 2207/10016* (2013.01); *G06T 2207/30196* (2013.01); *G06T 2207/30241* (2013.01); *G06T 2207/30252* (2013.01)

(58) Field of Classification Search
CPC ........ G06V 20/58; G06V 10/70; G06V 20/40; G06T 7/55; G06T 7/246; G06T 2207/10016; G06T 2207/30196; G06T 2207/30241; G06T 2207/30252; G08G 1/166
USPC ...................................................... 382/107
See application file for complete search history.

(56) References Cited

U.S. PATENT DOCUMENTS

| | | | | |
|---|---|---|---|---|
| 10,332,292 | B1 * | 6/2019 | Arnicar | G06T 11/60 |
| 11,321,951 | B1 * | 5/2022 | Chan | B60W 50/14 |

(Continued)

OTHER PUBLICATIONS

Lee, Jeong-Kyun, "Online Extrinsic Camera Calibration for Temporally Consistent IPM Using Lane Boundary Observations with a Lane Width Prior", Cornell University Computer Science Computer Vision And Pattern Recognition, (Aug. 2020), 6 pgs.

*Primary Examiner* — Kenny A Cese
(74) *Attorney, Agent, or Firm* — Schwegman Lundberg & Woessner, P.A.

(57) ABSTRACT

Methods, systems, and computer programs are presented to detect potential collisions of vehicles with a Vulnerable Road User (VRU). The provided solution includes a system designed to detect and warn against potential collisions with vulnerable road users (VRUs) using a combination of hardware and software components. The system employs one or more cameras installed on a vehicle to monitor the surrounding environment. These cameras capture image frames, which are processed by an onboard model to estimate potential collisions through trajectory analysis. In one aspect, the trajectory estimation includes using a bird's eye view transformation, which provides a top-down perspective of the scene to aid in trajectory estimation. Camera parameters are personalized per installation by determining a transformation matrix used to derive the bird's eye view.

20 Claims, 19 Drawing Sheets

(51) Int. Cl.
*G06V 20/40* (2022.01)
*G08G 1/16* (2006.01)

(56) References Cited

U.S. PATENT DOCUMENTS

| | | | | |
|---|---|---|---|---|
| 2008/0205706 | A1* | 8/2008 | Hongo | H04N 7/183 |
| | | | | 382/104 |
| 2018/0345958 | A1* | 12/2018 | Lo | G08G 1/096725 |
| 2019/0061712 | A1* | 2/2019 | Melik-Barkhudarov | |
| | | | | B60T 8/172 |
| 2022/0227367 | A1* | 7/2022 | Kario | G06V 40/103 |
| 2022/0306088 | A1* | 9/2022 | Rahimpour | B60W 30/0956 |
| 2023/0135234 | A1* | 5/2023 | Wang | G06V 10/774 |
| | | | | 382/103 |
| 2024/0214786 | A1* | 6/2024 | Sharma Banjade | H04W 4/40 |
| 2024/0355206 | A1* | 10/2024 | Abdelraouf | G06V 40/174 |
| 2025/0014209 | A1* | 1/2025 | Li | G06T 5/10 |
| 2025/0115279 | A1* | 4/2025 | Stein | B60W 60/0015 |
| 2025/0193649 | A1* | 6/2025 | Hasecke | H04W 4/40 |

* cited by examiner

VULNERABLE ROAD USER DETECTION

TECHNICAL FIELD

The subject matter disclosed herein generally relates to methods, systems, and machine-readable storage media for detecting collisions of vehicles with people on the road.

BACKGROUND

Current vehicle monitoring systems are not able to accurately predict and warn drivers of impending collisions with Vulnerable Road Users (VRUs), such as pedestrians, cyclists, and individuals using mobility devices. This can lead to scenarios where drivers are either not alerted in time or are overwhelmed by excessive false alerts, reducing the effectiveness of the warning system.

The problem occurs in the context of vehicles equipped with multiple cameras and sensors designed to monitor the surrounding environment. The variability in camera placement and the need for real-time processing of image data are significant challenges. The system must operate under various conditions, including different lighting and weather scenarios, which can affect the accuracy of detection and prediction.

The impact of this problem is significant, as it directly affects the safety of both vehicle occupants and VRUs. Failure to address the problem can result in an increased risk of accidents and collisions, potentially leading to injury or loss of life. The problem is exacerbated by the complexity of urban environments, where VRUs are more prevalent, and the likelihood of collision is higher.

BRIEF DESCRIPTION OF THE DRAWINGS

Various appended drawings illustrate examples of the present disclosure and cannot be considered limiting its scope.

DETAILED DESCRIPTION

Figure 1A:
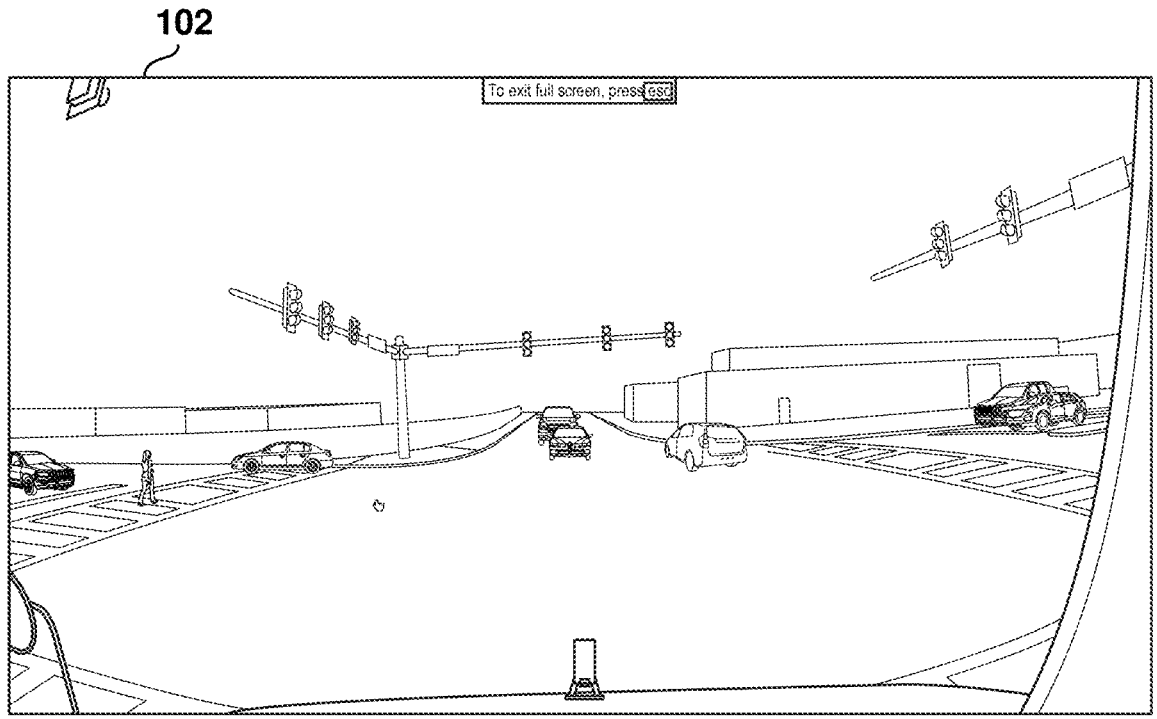
FIGS. 1A-1B are images related to a potential collision with a Vulnerable Road User (VRU), according to some examples.

Example methods, systems, and computer programs described herein are directed at detecting potential collisions of vehicles with a Vulnerable Road User (VRU). Examples merely typify possible variations. Unless explicitly stated otherwise, components and functions are optional and may be combined or subdivided, and operations may vary in sequence or be combined or subdivided. The following description provides numerous specific details to provide a thorough understanding of examples. However, it will be evident to one skilled in the art that the present subject matter may be practiced without these specific details.

The provided solution includes a system designed to detect and warn against potential collisions with vulnerable road users (VRUs) using a combination of hardware and software components. The system employs one or more cameras installed on a vehicle to monitor the surrounding environment. These cameras capture image frames, which are processed by an onboard model to estimate potential collisions through trajectory analysis. In one aspect, the trajectory estimation includes using a bird's eye view transformation, which provides a top-down perspective of the scene to aid in trajectory estimation. Camera parameters are personalized per installation by determining a transformation matrix used to derive the bird's eye view.

In some examples, data is gathered periodically (e.g., five times a second), and machine learning (ML) models provide outputs, such as pedestrian location, a depth map, and bounding boxes for object detection. The solution also includes a rules engine that uses outputs from various models to generate custom events and alerts related to VRU.

The system's flexibility allows it to function with varying camera placements, accommodating different vehicle configurations. The rationale behind the solution is based on advanced machine learning techniques and diverse model outputs, which improve decision-making in vehicle safety systems.

The solution addresses technical challenges such as the variability in camera placement and the need for real-time processing of image data. It resolves these issues by employing an ML model that integrates various outputs and a rules engine for dynamic customization. The expected outcomes include enhanced vehicle safety through real-time environmental analysis and the ability to alert drivers in advance, potentially preventing accidents. The system aims to minimize excessive alerts to maintain driver attention.

Glossary of Terms

Some of the concepts used for the description of the solution are presented below.

A Vulnerable Road User (VRU) is an individual or entity, such as a pedestrian, cyclist, or motorcyclist, that is at risk of collision with a vehicle and is detectable by the system.

A collision prediction is a determination made by analyzing the trajectories of a vehicle and a vulnerable road user (VRU) to assess the likelihood of a collision occurring based on their projected paths.

A drivable area is a region within an image that is classified as suitable for vehicle traversal, typically identified by a machine learning model to distinguish between roadways and non-drivable surfaces.

An ego vehicle is a vehicle equipped with monitoring equipment to detect a possible collision with a VRU.

A bounding box is a rectangular border used to define the position and dimensions of an object detected within an image frame, typically generated by a machine-learning model to facilitate object tracking and classification.

A confidence score is a numerical value assigned by a machine learning model to indicate the likelihood that a detected object, such as a VRU, is accurately identified within an image frame.

A depth mask is a visual representation that assigns depth values to objects within an image and is used to determine the distance of each object from the camera.

A segmentation mask is an outline generated by a machine-learning model that delineates the shape and boundaries of a detected object within an image frame.

A severity score is a calculated value that indicates the probability of a VRU collision event.

A trajectory estimation is the process of predicting the future path of an object, such as a VRU or a vehicle, based on its current and past positions within a sequence of image frames.

Figure 1B:
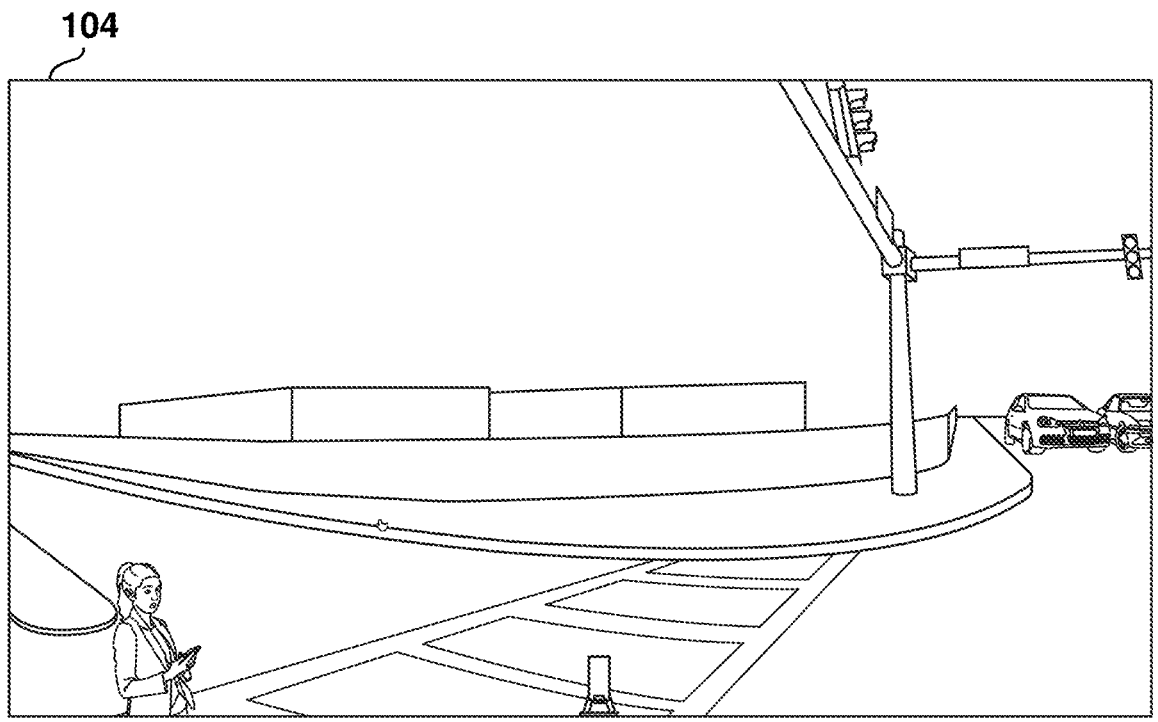

FIGS. 1A-1B are images related to a potential collision with a Vulnerable Road User (VRU), according to some examples. The objective is to identify VRUs (e.g., pedestrians, bicycles, motorcycles, scooters, wheelchairs, strollers) who are at risk of collision with the driver. The images may be captured by cameras in the vehicle that may be positioned in different locations, such as front dashcams, cameras on side-view mirrors, and rear-view cameras.

The goal is to assist drivers in preventing collisions by calculating the trajectory of a pedestrian walking at a specific angle and the rate at which the vehicle is turning, thus predicting a collision after a specific time interval.

Image 102 and image 104 are two images, from a sequence of images, captured from a vehicle's camera, depicting a potential collision scenario with a pedestrian.

In image 102, the vehicle is approaching an intersection. The view is from the vehicle's perspective. A pedestrian is seen on the left side, beginning to cross the street. The intersection includes traffic lights and road markings, and other vehicles are present, adding to the complexity of the scene. Image 102 captures an earlier moment where the pedestrian is still at a safe distance from the vehicle.

Image 104 shows a moment closer to a potential collision. The pedestrian is now significantly closer to the vehicle, indicating that both the vehicle and the pedestrian have continued moving towards each other.

Figure 2:
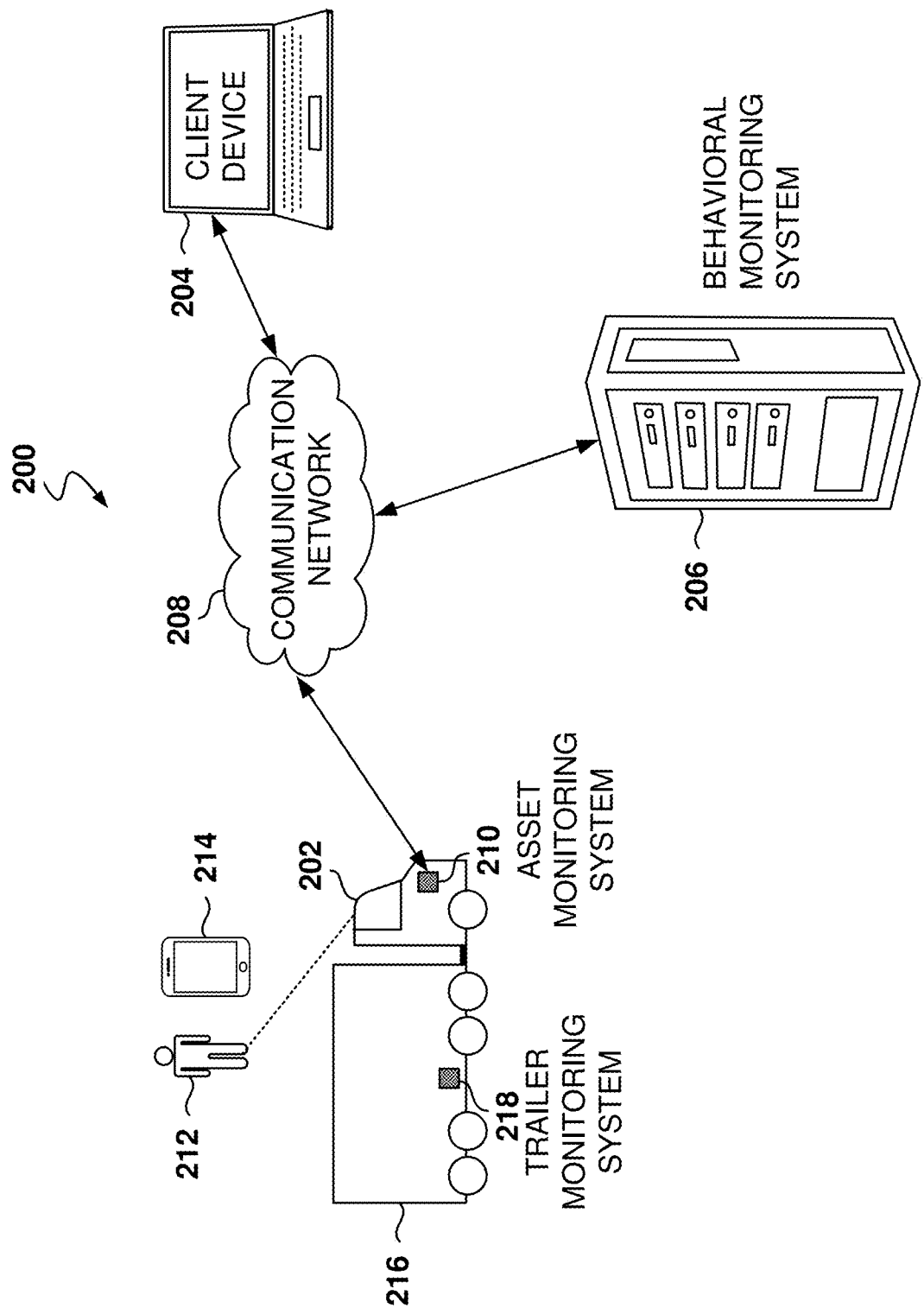
FIG. 2 shows a system for vehicle rider behavioral monitoring, according to some examples.

FIG. 2 shows a system 200 for vehicle rider behavioral monitoring, according to some examples. As shown, multiple devices (e.g., vehicle 202, trailer 216, client device 204, and behavioral monitoring system 206) are connected to a communication network 208 and configured to communicate with each other through the communication network 208. The communication network 208 is any type of network, including a local area network (LAN), such as an intranet, a wide area network (WAN), such as the internet, a mobile telephone network, a satellite communications network, or any combination thereof. The communication network 208 is implemented using any number of communication links associated with one or more service providers, including one or more wired communication links, one or more wireless communication links, or any combination thereof.

The vehicle 202 may be any type of vehicle or combination vehicle, such as an automobile, semi-trailer truck, trailer, plane, train, ship, and the like. Further, the techniques presented herein may be used with other non-moving assets that are operated by an operator (e.g., cranes, manufacturing equipment, call centers) and assets that are controlled remotely (e.g., drones, air traffic controllers). The examples described herein should, therefore not be interpreted to be exclusive or limiting, but rather illustrative.

As shown, the vehicle 202 includes an asset monitoring system (AMS) 210 that allows for monitoring events at the vehicle and exchanging information and commands between the vehicle 202 and one or more remote computing devices via the communication network 208. In some examples, the AMS includes a communications device (also referred to as a vehicle gateway) and a camera device. The trailer 216 includes a TMS 218 that allows for monitoring events at the trailer and exchanging information and commands between the trailer 216 and other computing devices (e.g., the behavioral monitoring system 206, the AMS 210) via the communication network 208. In some examples, the TMS 218 includes an asset gateway, which is a device installed in the trailer for capturing data and sending the data to the BMS.

The asset monitoring system 210 may include one or more hardware devices to perform monitoring functions at the vehicle, such as a communications device and a camera device, but other configurations are also possible.

The asset monitoring system 210 allows the vehicle 202 to transmit data, such as sensor data gathered by sensors in the vehicle 202, to a remote computing device. The vehicle 202 may be equipped with a variety of sensors that capture data describing the performance of the vehicle 202, actions performed by riders in and around the vehicle 202, and the vehicle's surrounding environment.

The behavioral monitoring system 206 is a computing system consisting of one or more computing devices configured to provide remote behavioral monitoring of the vehicle 202 to detect different conditions of the driver state and execute corresponding responses. For example, the behavioral monitoring system 206 may allow a user, such as a fleet manager administrator, to define a set of triggering conditions and criteria for detecting and responding to undesirable behavior or dangerous conditions.

To utilize the functionality of the behavioral monitoring system 206, users (e.g., administrators and fleet managers) may use the client device 204. Although the shown system 200 includes only one client device 204 and one vehicle 202, this is only for ease of explanation and is not meant to be limiting. One skilled in the art would appreciate that the system 200 could include any number of client devices 204 and vehicles 202. Further, the behavioral monitoring system 206 may concurrently accept communications from and initiate communication messages, interact with any number of client devices 204 and vehicles 202, and support connections from a variety of different types of client devices 204.

A user may interact with the behavioral monitoring system 206 via a client-side application installed on the client device 204. In some examples, the client-side application includes a component specific to the behavioral monitoring system 206. For example, the component may be a stand-alone application, one or more application plug-ins, or a browser extension. However, the users may also interact with the behavioral monitoring system 206 via a third-party application, such as a web browser or messaging application, that resides on the client device 204 and is configured to communicate with the behavioral monitoring system 206. In either case, the client-side application presents a user interface (UI) for the user to interact with the behavioral monitoring system 206.

The behavioral monitoring system 206 may provide a user interface that allows administrators to configure the triggering conditions. Each triggering condition defines one or more individual conditions that, if satisfied, indicate the occurrence of an undesirable behavior or an important event such as a collision. For example, a triggering condition may be satisfied when a truck approaches a bridge with lower clearance than the height of the truck or the trailer. As another example, a triggering condition may define unsafe lane-departure events.

The user interface also enables the administrators to define corresponding actions to be performed in the event that a triggering condition has been satisfied/triggered. For example, the user interface enables the administrator to define contact identifiers (e.g., email addresses, phone numbers, etc.) to which notifications are to be sent. Similarly, the user interface enables the administrator to define actions for generating an incident report based on the detected occurrence of undesirable behavior.

Further, a driver 212 may interact with the behavioral monitoring system 206 and the AMS 210 via a mobile device 214. A BMS application (app) may execute on the mobile device 214 and connect (e.g., via wireless communication such as cellular, WiFi, or Bluetooth) to the AMS 210 and the behavioral monitoring system 206 to perform operations related to the BMS, such as getting information for a trip, receiving feedback regarding in-vehicle behavior, attend training, etc. Alternatively, the driver 212 may access the same functionality via a web browser executing on the mobile device 214.

Figure 3:
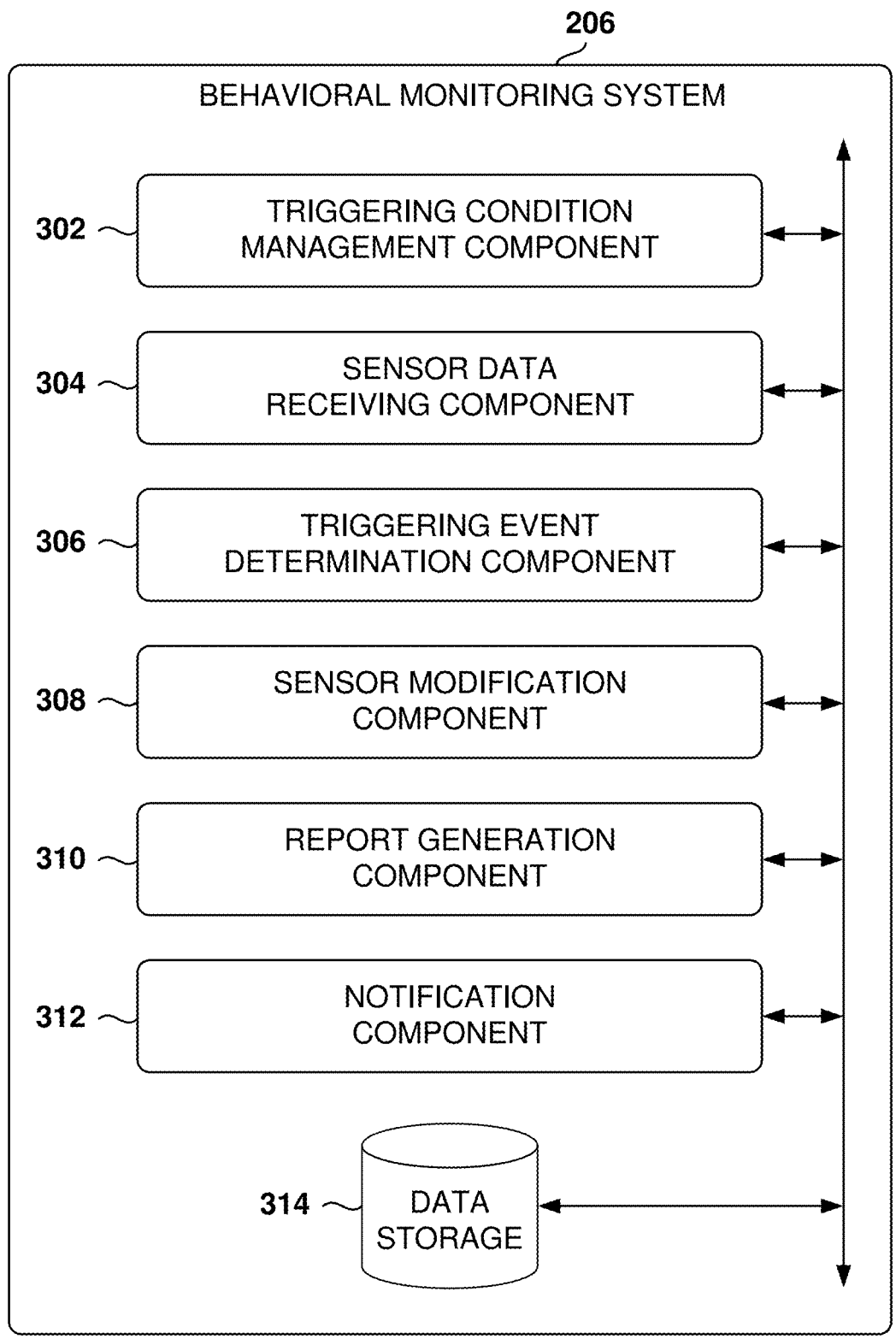
FIG. 3 is a block diagram of a Behavioral Monitoring System (BMS), according to some examples.

FIG. 3 is a block diagram of a behavioral monitoring system 206 (BMS), according to some examples. To avoid obscuring the inventive subject matter with unnecessary detail, various functional components (e.g., modules) that are not germane to conveying an understanding of the inventive subject matter have been omitted from FIG. 3. The various functional components depicted in FIG. 3 may reside on a single computing device or may be distributed across several computing devices in various arrangements, such as those used in cloud-based architectures.

The behavioral monitoring system 206 includes a triggering condition management component 302, a sensor data receiving component 304, a triggering event determination component 306, a sensor modification component 308, a report-generation component 310, a notification component 312, and a data storage 314.

The triggering condition management component 302 facilitates the generation and modification of triggering conditions. For example, triggering condition management component 302 provides a graphical user interface that allows administrators to generate and modify triggering conditions. Each triggering condition defines one or more individual conditions that, if satisfied, indicate the occurrence of an undesirable behavior, as well as a corresponding set of response actions to be performed if the triggering condition has been satisfied. The user interface provided by the triggering condition management component 302 enables administrators to define the triggering conditions. Triggering conditions may include any one or combination of specific criteria or parameters that, when met or surpassed, prompts a predetermined or user-defined response within the system. For example, such conditions can include: thresholds; the detection of image features from camera feeds; anomalies in sensor data, such as irregular steering or braking patterns; behavioral patterns, including, for example, a lack of interaction with vehicle controls or infrequent checks of mirrors; as well as the presence of certain environmental factors like the time of day, adverse weather conditions, or high traffic density.

Similarly, an administrator may use the user interface elements to define corresponding actions to be performed in the event that a triggering condition has been triggered. In some examples, the triggering condition management component 302 stores the generated triggering conditions in the data storage 314. The stored triggering conditions may be associated with an account and fleet identifier that identifies the account, vehicle fleet, or vehicles to which the triggering conditions are associated.

The sensor data receiving component 304 receives sensor data from the vehicles 202, including data from the sensors in the AMS 210. The sensor data receiving component 304 provides the sensor data to the other components of the behavioral monitoring system 206 for use in detecting the occurrence of undesirable behavior. The sensor data receiving component 304 may also store the sensor data in the data storage 314, where it may be accessed by the other components of the behavioral monitoring system 206. For example, the stored sensor data may be associated with a unique identifier associated with the vehicle 202 from which the sensor data was received. The sensor data may also include timestamp data indicating the time at which the sensor data was captured by the sensors of the vehicle 202 or when the sensor data was received by the behavioral monitoring system 206.

The triggering event determination component 306 uses the sensor data received by the sensor data receiving component 304 to determine whether any of the triggering conditions have been satisfied. In some examples, a triggering condition may be based on a combination of individual conditions, such as a combination of detecting specified terms, detecting specified motions, or detecting a specified volume level. In these types of examples, the triggering event determination component 306 may use the sensor data to determine that each of the individual conditions has been satisfied within a predetermined time window, such as within a five-second window. For example, the triggering event determination component 306 may use timestamp data associated with the sensor data to determine whether each of the individual conditions was satisfied within the predetermined time window. Accordingly, the triggering condition is satisfied when each of the individual conditions occurs within the predetermined time window.

The triggering event determination component 306 notifies the other components of the behavioral monitoring system 206 if a triggering condition has been triggered.

The sensor modification component 308 modifies the operating mode of sensors in the vehicle 202. In some cases, an administrator or fleet manager may wish to capture additional or higher-quality sensor data to document a detected incident of undesirable behavior. For example, the administrator or fleet manager may wish to initiate the use of sensors, such as cameras, microphones, or other sensor devices, to capture sensor data and document the incident.

The report-generation component 310 generates an incident report to document a detected occurrence of undesirable behavior. The incident report may include any of a variety of data defined by an administrator in a triggering condition. For example, an incident report may include data identifying the vehicle 202, the driver of the vehicle, the time of the incident, the action that satisfied the triggering condition (e.g., lane departure, tampering, driving while drowsy, etc.), as well as captured sensor data depicting the incident. The report-generation component 310 may store the incident report in the data storage 314, where an administrator or other authorized user may access it.

The notification component 312 generates and transmits a notification to users defined by the triggering condition. For example, the notification component 312 identifies a contact identifier corresponding to the triggering event. An administrator may define the contact identifier when generating the triggering event. The contact identifier provides contact details for reaching a user designated to receive a notification when the triggering event is triggered. For example, the contact identifier may be an email address, phone number, and the like.

The notification component 312 may then transmit a notification directed to the content identifier. The notification may provide details of the detected incident, such as a description of the undesirable behavior, time, associated vehicle 202, and the like. The notification may also enable a user to access an incident report associated with the detected incident.

Figure 4:
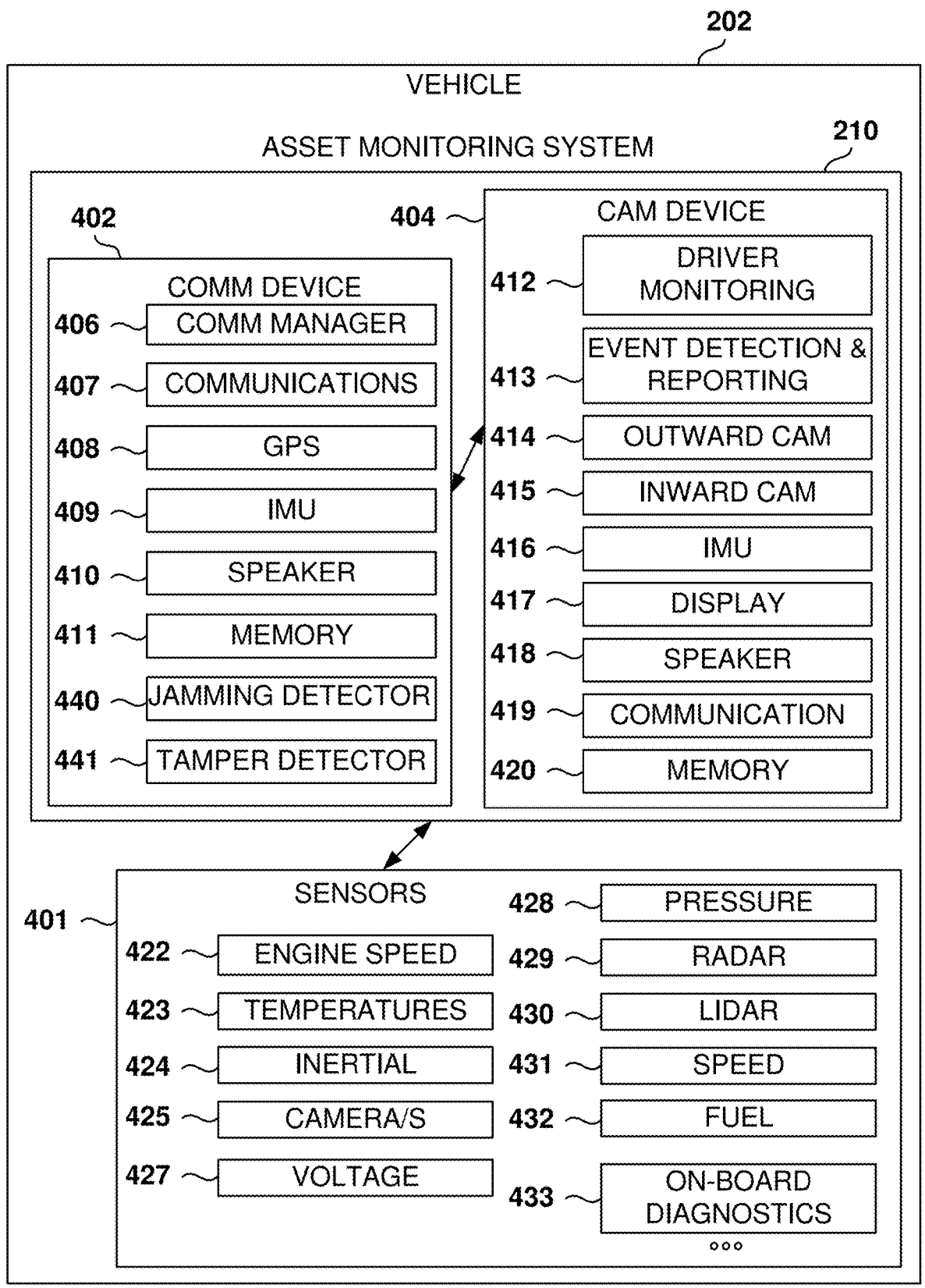
FIG. 4 illustrates the components of a vehicle for rider behavioral monitoring, according to some examples.

FIG. 4 illustrates components of a vehicle 202 for rider behavioral monitoring, according to some examples. The vehicle 202 includes the asset monitoring system 210 and a plurality of sensors 401. The AMS 210 may include a single device or distribute its functions across a plurality of devices in the vehicle (e.g., sensors, processors, communications devices) that are able to communicate among themselves. In the illustrated example, the AMS 210 includes a communication (comm) device 402 and a camera (cam) device 404, but other examples may utilize different numbers of devices or distribute their functionality differently.

The comm device 402 provides communication services within the vehicle and the network and may connect to the diagnostic port in the vehicle to gather vehicle information. In some examples, the comm device 402 includes a communications manager 406, a communications module 407, a Global Positioning System (GPS) 408, an Inertial Measurement Unit (IMU) 409, a speaker 410, computer memory 411 (RAM and permanent storage), a jamming detector 440, a tamper detector 441, and one or more processors (not shown). The GPS 408 and the IMU 409 may be used, together or separately, to calculate the speed of the vehicle.

The communications manager 406 coordinates communications with the BMS and other devices in the vehicle, such as the cam device 404. The communications module 407 provides one or more communication interfaces, such as mobile telephony, satellite communications, WiFi, Bluetooth, etc. Further, the communications manager 406 may provide a WiFi hotspot to other devices in the vehicle so these devices can communicate to the network via the WiFi hotspot.

The IMU 409 sensor detects the motion and orientation of the vehicle, and the memory 411 stores data collected during the operation of the vehicle and programs that may be executed on the comm device 402.

The jamming detector 440 detects when the electronic signals (e.g., Global Positioning System (GPS)) to the vehicle are being jammed, such as by utilizing a GPS jammer. The GPS jammer is a device that disrupts or interferes with the signals from GPS satellites by emitting radio frequency signals that can overwhelm the GPS signals, making it difficult or impossible for GPS receivers to determine their location accurately. The GPS jammers may use interference to broadcast signals at the same frequency as GPS satellites, which can overpower the weak signals from space. This interference can cause the GPS receiver to lose its lock on the satellite signals, rendering it unable to calculate its position. The GPS jammers may also use jamming signals that are stronger than the GPS signals, which are already weak when they reach the Earth's surface. The tamper detector 441 is for detecting tampering, such as when the dashboard cover is being removed.

In some examples, the cam device 404 includes a driver monitoring module 412, an event detection and reporting system 413, an outward camera 414 that captures images in the direction of travel, an inward camera 415 that captures images of the vehicle cabin, an IMU 416, a display 417 (e.g., a touchscreen, computer display, LED lights), a speaker 418, a communications module 419, a memory 420, and a processor (not shown). The inward camera 415 is installed within the vehicle cabin to monitor the driver and passengers, while the outward camera 414 provides visual information about the environment surrounding the vehicle.

The driver monitoring module 412 performs one or more activities regarding driver behavior, such as LD detection, driving while drowsy, following too close, sudden braking, etc. The event detection and reporting system 413 is configured to identify and log significant events based on sensor data. For example, the event detection and reporting system 413 may detect when the truck is approaching a bridge, and there is a risk of collision. The display 417 provides visual feedback and information to the vehicle occupants, while the speaker 418 provides auditory information or alerts. Further, the memory 420 stores data collected during the operation of the vehicle and programs that may be executed on the cam device 404.

In some examples, the cam device 404 is configured to execute the machine learning models, but other examples may execute the machine learning models in the comm device 402. Other configurations may include additional devices within the AMS 210 or consolidate all functions within a single device.

In some examples, the comm device 402 and the cam device 404 are connected via a hardwire connection (e.g., USB), and the cam device 404 may be powered via this hardwire connection. In some examples, the comm device 402 draws power from the vehicle's electrical system. Further, the AMS may include other sensors, such as any of the sensors 401. The AMS 210 is configured to communicate with any of the sensors 401 in the vehicle.

The sensors 401 are configured to monitor various parameters and states of the vehicle. In some examples, the sensors 401 include an engine speed sensor 422 that measures the revolutions per minute of the engine, temperature sensors 423 that measure various temperature points in the vehicle (e.g., cabin, engine, outside), and inertial sensors 424 that detect motion and orientation of the vehicle. The sensors 401 may also include one or more cameras 425 that may be installed in different parts of the vehicle, a voltage sensor 427 that monitors the electrical system of the vehicle, and pressure sensors 428, which detect the pressure in various systems such as tires or hydraulic systems. Further, the sensors 401 may include radar sensors 429 and Light Detection and Ranging (LIDAR) sensors 430, which provide distance and mapping capabilities for the vehicle's surroundings. A speed sensor 431 measures the traveling speed of the vehicle, and fuel sensors 432 monitor the amount of fuel in the tank. The vehicle may also include an on-board diagnostics system 433 for self-diagnosis and reporting of the operational status of the vehicle 202.

Figure 5:
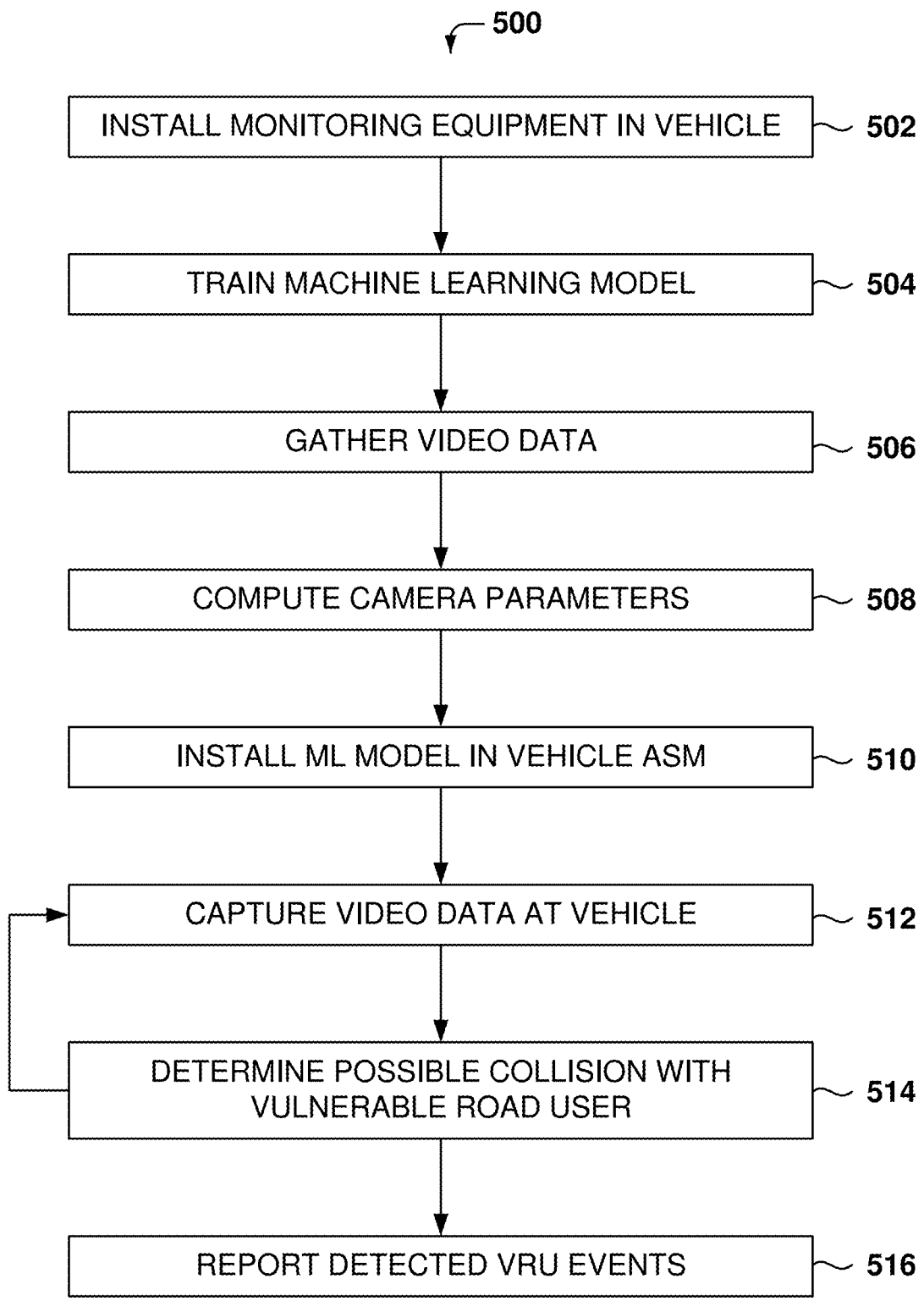
FIG. 5 is a flowchart of a method for VRU collision detection, according to some examples.

FIG. 5 is a flowchart of a method 500 for VRU collision detection, according to some examples. While the various operations in this flowchart are presented and described sequentially, one of ordinary skill will appreciate that some or all of the operations may be executed in a different order, be combined or omitted, or be executed in parallel.

At operation 502, monitoring equipment is installed in the vehicle. This involves setting up the comm device 402 and the cam device 404. Optionally, other cameras may be installed on various parts of the vehicle, such as the front, sides, and rear, to monitor the surrounding environment. These cameras may be third-party cameras.

From operation 502, the method 500 flows to operation 504, where a machine-learning model is trained. In some examples, the training involves using data from larger teacher models that provide training data information, e.g., annotations, depth maps, and bounding boxes for object detection. The model is designed to integrate various outputs, such as pedestrian depth and object detection, into a single model capable of processing preprocessed image data to estimate potential collisions.

From operation 504, the method 500 flows to operation 506, where video data is gathered. Operation 506 involves capturing image frames from the installed cameras and preprocessing them for further analysis. Preprocessing includes normalizing the image data and adjusting for any distortions or variations caused by camera placement.

From operation 506, the method 500 flows to operation 508, where camera parameters are computed. In some examples, this involves calculating a homography matrix for each camera, which is a 3×3 matrix used to transform the image perspective into a bird's eye view. The transformation matrix is personalized based on specific camera parameters, such as roll, pitch, yaw, and focal length, ensuring accurate trajectory estimation.

From operation 508, the method 500 flows to operation 510, where the machine learning model is installed in the vehicle's AMS 210. This installation enables the system to process image data in real time, providing outputs such as depth estimation and object trajectories.

From operation 510, the method 500 flows to operation 512, where video data is captured at the vehicle. The system samples image data at a predefined frequency (e.g., five times a second), capturing frames from the installed cameras for real-time processing and analysis.

From operation 512, the method 500 flows to operation 514, where the system determines possible collisions with a vulnerable road user. This involves using algorithms for trajectory analysis, which predict the movement of detected objects and the vehicle itself.

From operation 514, the method 500 flows to operation 516, where detected VRU events are reported. In some examples, the system generates custom events and alerts using a rules engine configured to recognize specific scenarios, such as potential collisions. The rules engine can dynamically generate rules based on the model's outputs, allowing for customization and adaptation to different driving environments.

Figure 6:
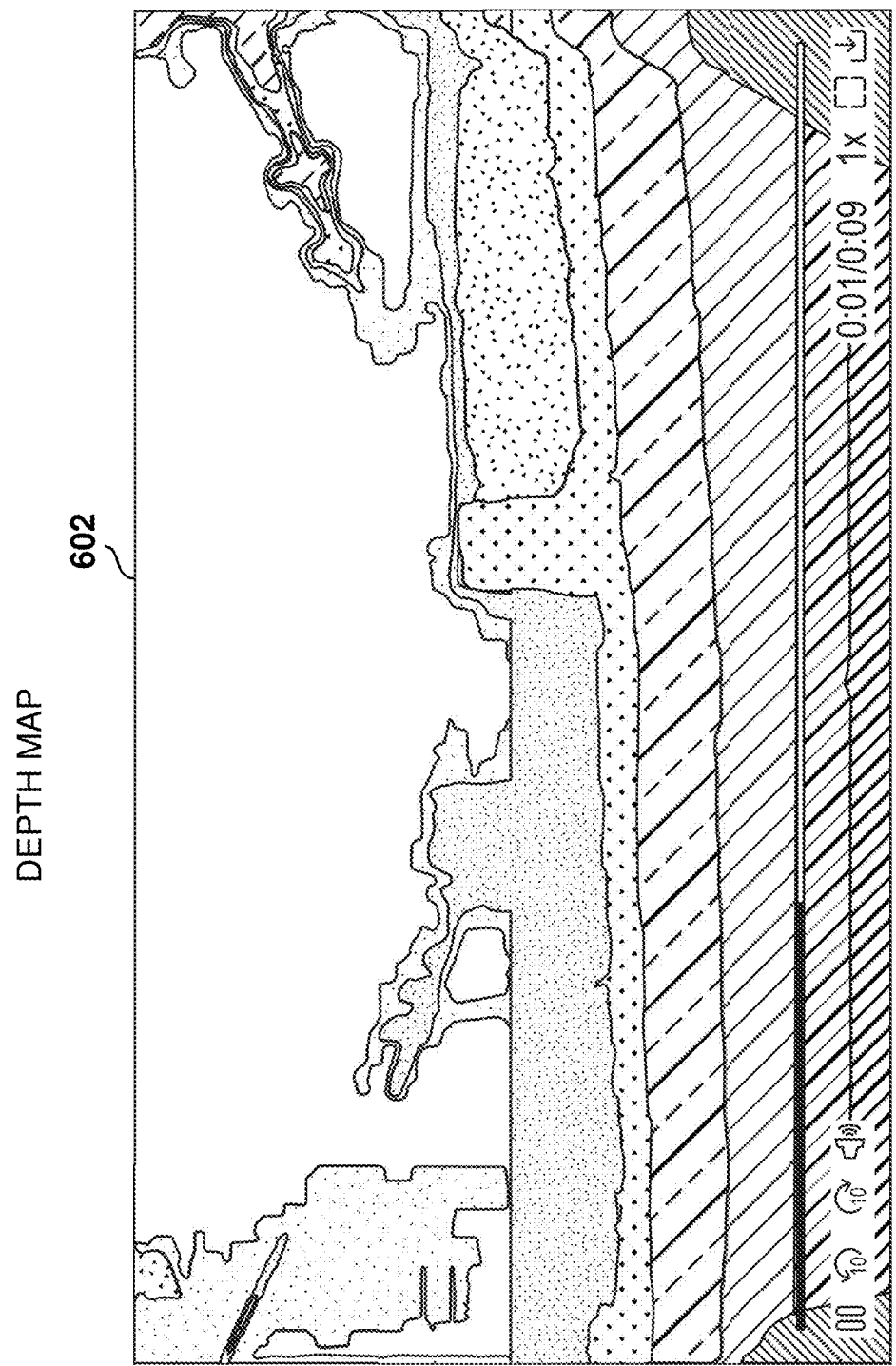
FIG. 6 shows a depth map for the image of FIG. 1A, according to some examples.

FIG. 6 shows a depth map 602 for the image of FIG. 1A, according to some examples. The depth map 602 provides a visual representation of the distance of various objects from the camera, using color gradients to indicate depth. This visualization is important for understanding the spatial arrangement of objects in the scene, which is necessary for accurate trajectory estimation and collision prediction.

The depth map 602 is generated by processing image frames captured by the vehicle's cameras. The process overlays instance segmentation masks onto a global depth mask to determine the depth of each detected object. This involves utilizing the maximum value from the instance depth mask to assign a single depth value to each bounding box (as shown in FIG. 7), thereby providing a clear indication of how far each object is from the vehicle.

The depth map 602 enhances the understanding of the environment by providing detailed depth information. This information is used in conjunction with other data, such as bounding box coordinates and trajectory analysis, to predict potential collisions with VRUs. By accurately determining the distance of objects, the system can assess the likelihood of a collision and issue timely warnings to the driver, thereby improving vehicle safety.

In some examples, the depth map 602 is one of the outputs from the VRU ML model, which is trained using data from larger teacher models. These teacher models provide annotations and depth maps that are used to train the VRU ML model, enabling the processing of preprocessed image data and the estimation of potential collisions.

Figure 7:
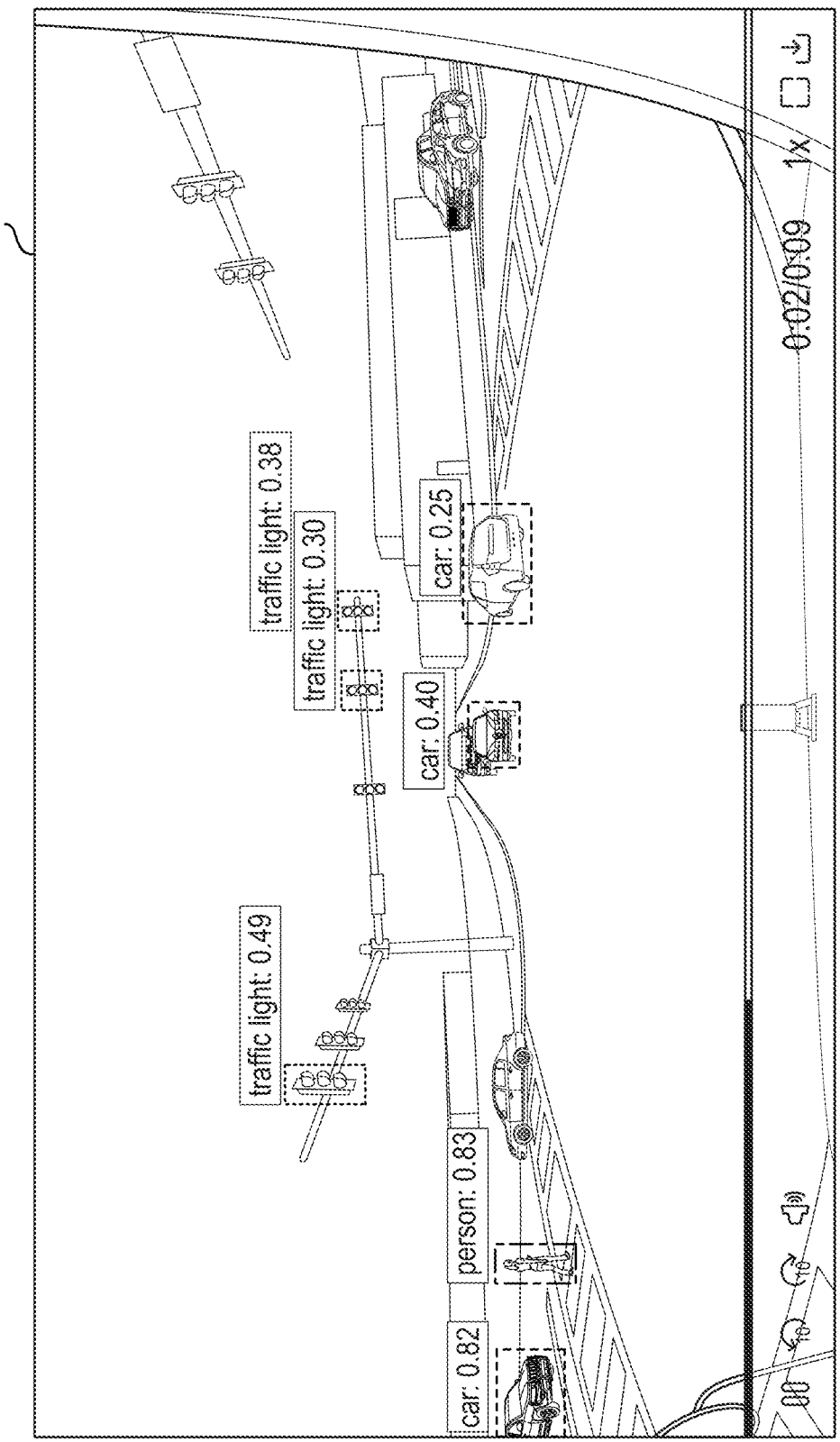
FIG. 7 shows items detected by the VRU-detection Machine Learning (ML) model, according to some examples.

FIG. 7 shows an image 702 with items detected by the VRU-detection Machine Learning (ML) model, according to some examples. Element identification includes detecting and labeling objects in the scene.

Image 702 demonstrates the ability to accurately identify and classify multiple objects at the same time. Each object is enclosed within a bounding box, and a confidence score is displayed, indicating the system's assessment of the classification. For instance, traffic lights are identified with a confidence score of 0.43, while other objects like buses and cars have varying confidence levels, reflecting the system's assessment of the scene. Element Identification enhances situational awareness by providing a comprehensive analysis of the surroundings.

Image 702 highlights the system's ability to operate in complex urban environments where multiple road users and objects are present. The accurate detection and classification of these elements assist in the effectiveness of predicting and preventing accidents to ensure the safety of vulnerable road users.

Figure 8:
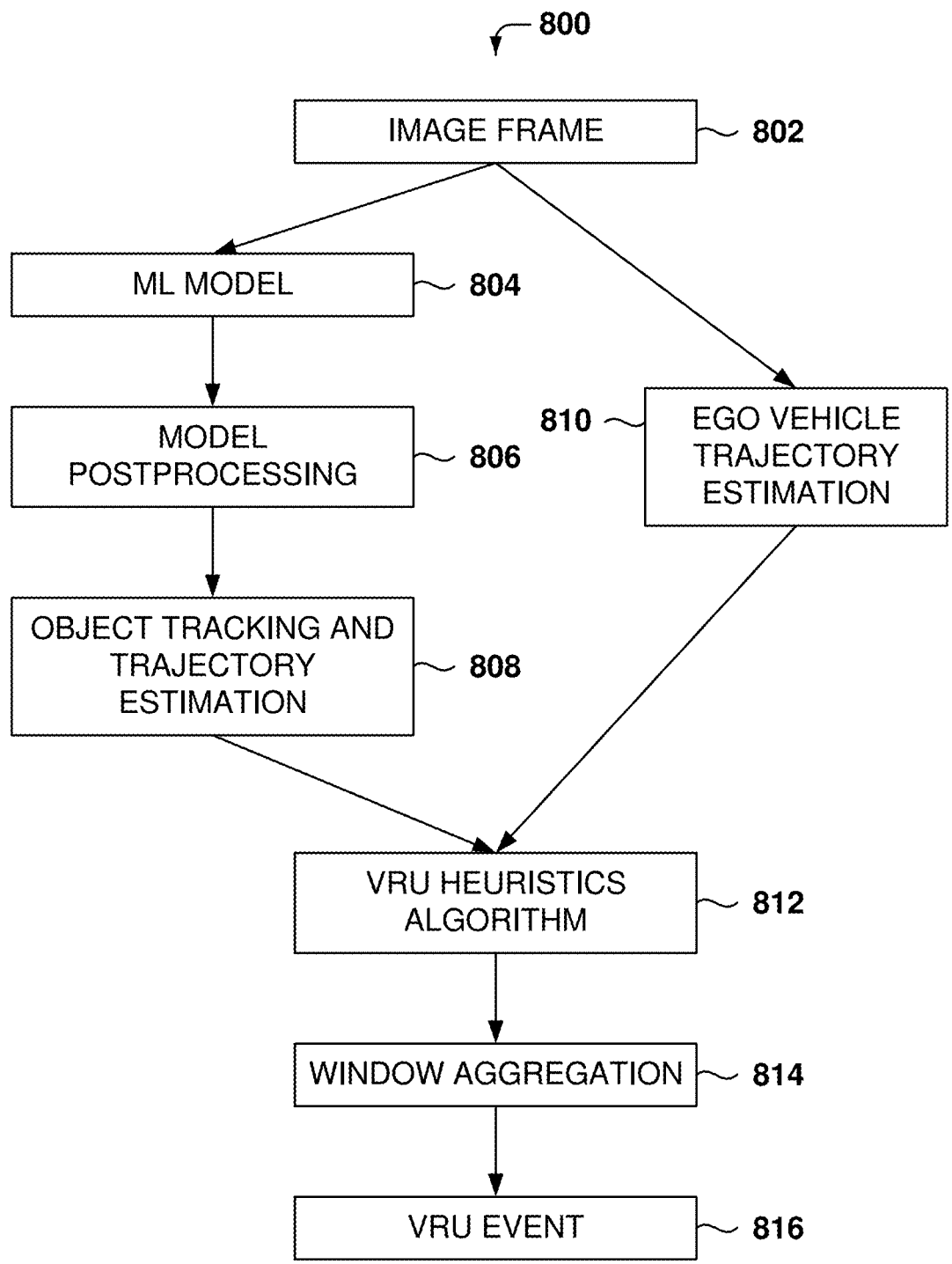
FIG. 8 is a flowchart of a method for detecting VRU objects, according to some examples.

FIG. 8 is a flowchart of a method 800 for detecting VRU objects, according to some examples. While the various operations in this flowchart are presented and described sequentially, one of ordinary skill will appreciate that some or all of the operations may be executed in a different order, be combined or omitted, or be executed in parallel.

At operation 804, an image frame 802 is input into an ML model. The ML model processes the image frame 802 to generate outputs such as bounding box coordinates, labels, confidence scores, and instance segmentation masks.

From operation 804, the method flows to operation 806, where model postprocessing is performed. This operation involves refining the outputs of the ML model, such as overlaying instance segmentation masks onto a global depth mask to determine the depth of each detected object. During post-processing, the VRU model overlays the instance segmentation masks onto the global depth mask to determine the depth of each detected object. In some examples, the maximum value from the instance depth mask is used as a reference to assign a single depth value to each bounding box From operation 806, the method flows to operation 808, where object tracking and trajectory estimation are conducted. Operation 808 utilizes the refined data to track objects over time and estimate their trajectories. The process involves calculating the movement of objects within a sequence of image frames. Although one image frame is shown, the estimation of the trajectory includes using other image frames previously captured. In some examples, a predetermined number of images is used, separated by a predefined amount of time, e.g., the last five images separated by 200 ms, but another number of images and periods of time may be used.

For each detected object, a prediction is made to predict the future position after a specified number of seconds. Each object is tracked over time with the goal of forecasting its subsequent location. In some examples, filtering is performed to select the relevant object detections for only genuine VRUs, such as pedestrians and cyclists, but not other objects like traffic lights or cars.

Simultaneously, the image frame 802 is used as input for ego vehicle trajectory estimation at operation 810, which includes calculating the trajectory using the image frame 802 as well as one or more previous image frames.

This operation uses optical flow techniques to determine the direction and movement of the vehicle. The ego vehicle's trajectory is used in the analysis of potential collisions with VRUs.

From operations 808 and 810, the method flows to operation 812, where a VRU heuristics algorithm is applied to determine if a VRU event is about to occur. This algorithm uses the data from object tracking and ego vehicle trajectory estimation to assess the likelihood of a collision with a VRU. The algorithm considers factors such as object depth, position, and motion state to calculate a severity score.

For each VRU detection, a severity score indicating the probability of a VRU event is calculated, where the higher the severity score, the higher the probability of a VRU collision. In some examples, the severity score is based on the depth, position (inside, outside, or on the contour), and motion state (approaching, leaving, or staying). If the severity score surpasses a configurable threshold, the VRU is flagged as the vehicle is on a collision course.

From operation 812, the method flows to operation 814, where window aggregation is performed. In some examples, the method 800 is performed periodically at a predetermined frequency, e.g., five times a second, to determine the probability of VRU collision. Operation 812 aggregates the results of the VRU heuristics algorithm (operation 812) over a specified time window. The process reviews the data to identify consistent patterns that indicate a potential collision, helping to minimize false positives.

In some examples, the window aggregator compiles VRU results from the prior VRU calculation cycles over a designated window, examining the most recent n (e.g., four) VRU-estimation results. A counter is created and incremented whenever any frame's VRU detections suggest a potential collision. If this counter exceeds the defined window threshold, the result is classified as a VRU-collision event. This methodology reduces false positives by requiring multiple consecutive detections before issuing a VRU collision warning From operation 814, the method proceeds to operation 816, where a VRU event is generated when a collision is about to occur or is close to occur. This event represents the detection of a potential collision with a VRU, triggering alerts or actions to prevent the collision. If the VRU event is detected, the AMS may send a short video (e.g., 20 seconds) of the event to the BMS for viewing by the fleet manager.

In some examples, the list of VRUs includes:
pedestrians, e.g., adults, children, elderly individuals, persons with disabilities (e.g., wheelchair users, visually impaired), pregnant individuals, runners and joggers, pedestrian workers (e.g., construction workers, traffic officers), emergency responders (police, paramedics, firefighters);
cyclists;
motorcyclists;
motorbike riders (e.g., scooters, mopeds, motorcycles);
scooter (manual or electric);
users of wheelchairs (manual or electric);
skateboarders;
roller skaters and inline skaters;
hoverboard riders;
strollers (with or without babies); and
animal-related VRUs, e.g., horse riders, animal handlers (e.g., dog walkers). It is noted that animals by themselves will not be considered as VRU since the word user refers to people. But people riding animals must be accounted for. In some examples, VRUs may also include animals, like a potential collision with a cow or a deer.

In some examples, the VRU model generates a VRU value and a should-trigger VRU value. There are five possible subcategories for the VRU value, and each option is incrementally more severe. When the conditions for multiple options are satisfied, the most severe meaning is selected. The VRU categories include no VRU, has VRU not on drivable area, drivable area, has VRU in collision path but safe, and has VRU in collision path and unsafe For no VRU, no vulnerable road users are visible in the entire video. VRU Not on Drivable Area refers to a vulnerable person who is not in the same leveled surface area as the one the driver is in. For example, a sidewalk is at a higher level than the road. Therefore, a person on a sidewalk is considered not to be in the drivable area of the vehicle. Usually, a person on the road will most likely be a person in the drivable area. A drivable area refers to a space where the vehicle can drive, such as the road, a parking lot, a construction road, or an off-road path.

VRU on drivable area means that a vulnerable person is in the same drivable area in the vicinity of the vehicle. This can be a person on the road walking on the streets or crossing the street, or a bicycle or a motorcycle on a different lane.

The category has VRU in collision path but safe is when a vulnerable person is in the drivable area and inside the driver's collision path but is still relatively safe. Another example is when the driver is at a complete stop at a stop sign or red light. In these cases, people would be presumed to be safe as long as the vehicle is not moving.

In a collision path means that the vulnerable person is in front of the path of the driver even if the vulnerable person is far away from the driver as long as the vulnerable person crosses at some point in front of the driver's path.

In some examples, to determine that the VRU is in a collision path and unsafe, three conditions have to be satisfied: the vulnerable person is on the vehicle's drivable area, the vulnerable person at some point in the video is inside the direct path of the driver, and the vulnerable person is in an unsafe or relatively dangerous situation if the vehicle or the VRU does not change trajectory.

Figure 9:
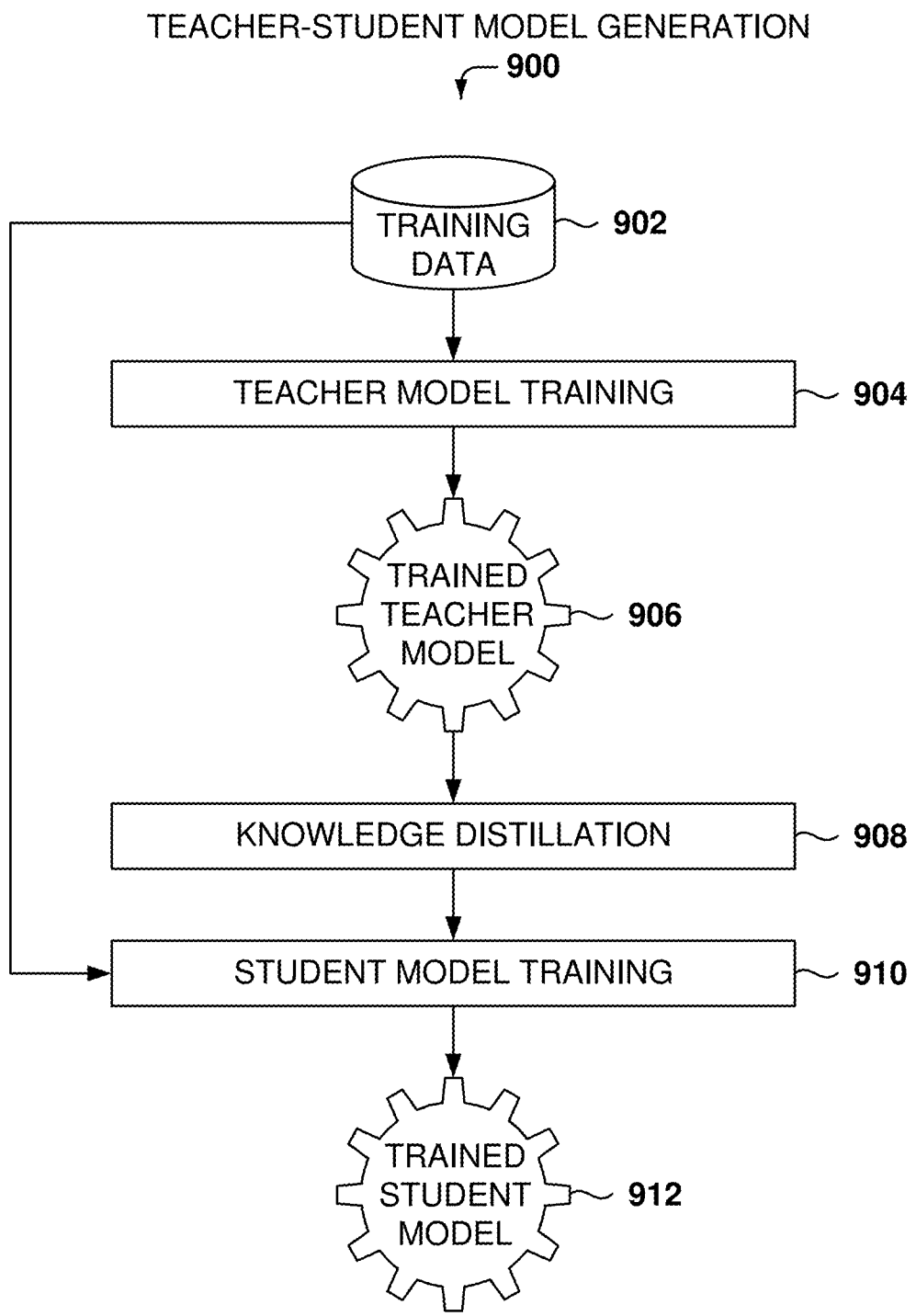
FIG. 9 is a flowchart of a method for generating the model using a teacher model, according to some examples.

FIG. 9 is a flowchart of a method 900 for generating the model using a teacher model, according to some examples. While the various operations in this flowchart are presented and described sequentially, one of ordinary skill will appreciate that some or all of the operations may be executed in a different order, be combined or omitted, or be executed in parallel.

In machine learning, a teacher model is a trained model that is used to guide, supervise, or improve the learning process of another model, often referred to as the student model.

The teacher model is usually a large, complex, and well-trained model that has learned from a vast amount of data, and the teacher's predictions (e.g., probabilities, embeddings, or intermediate features) are used to train the smaller, more efficient student model.

There is a transfer of knowledge, where instead of training the student solely on raw data and labels, the student model learns from the soft labels (e.g., probabilistic outputs) or feature representations of the teacher.

The student model is often much smaller and faster while retaining high accuracy. Also, the student model provides scalability as it helps scale AI to environments with limited computational resources. Further, the student models trained using teacher models often generalize better due to richer training signals.

Training data 902 is collected and prepared for use in the model training process. At operation 904, the teacher model training is conducted. The training data 902 is utilized to train the teacher model. The teacher model is typically a large, complex model that learns from a vast amount of data to generate accurate predictions or classifications.

The result of the training is a trained teacher model 906.

From operation 904, the method 900 flows to operation 908, where knowledge distillation occurs. In this operation, the trained teacher model's knowledge is distilled into a more compact form. This involves transferring the learned information from the teacher model to a student model, often through the use of soft labels or feature representations.

From operation 908, the method 900 flows to operation 910, where student model training is performed. The student model is trained using the distilled knowledge from the teacher model, along with all or part of the original training data 902. The result is a trained student model 912.

To create the VRU model, the information from several teacher models is used. The teacher models are trained for specific tasks, such as finding bounding boxes of objects in the image or calculating a depth map.

In one example implementation, the training data includes 500K front-facing videos with 21K including VRU events, 20K rear-facing videos with 700 including VRU events, 50K left- or right-side camera videos, 200K videos from sample harvester, and 150 videos with labels created by an LLM. However, other implementations may include a different number of training data elements.

In some examples, the training data comprises two types of data. The first combination consists of data that has been annotated by humans, including the identification of bounding boxes and segmentation masks. The second type involves the automatic generation of labels (e.g., bounding box annotations on videos, images, segmentation masks, or depth masks) utilizing one or more teacher models.

The VRU model takes as input one or more image frames and generates an output with VRU information, such as the depth mask, identified objects (type and bounding box), the VRU severity score, type of VRU identified (e.g., pedestrian, motorcyclist), the horizon on the image, direction of gravity in the image, etc.

Figure 10:
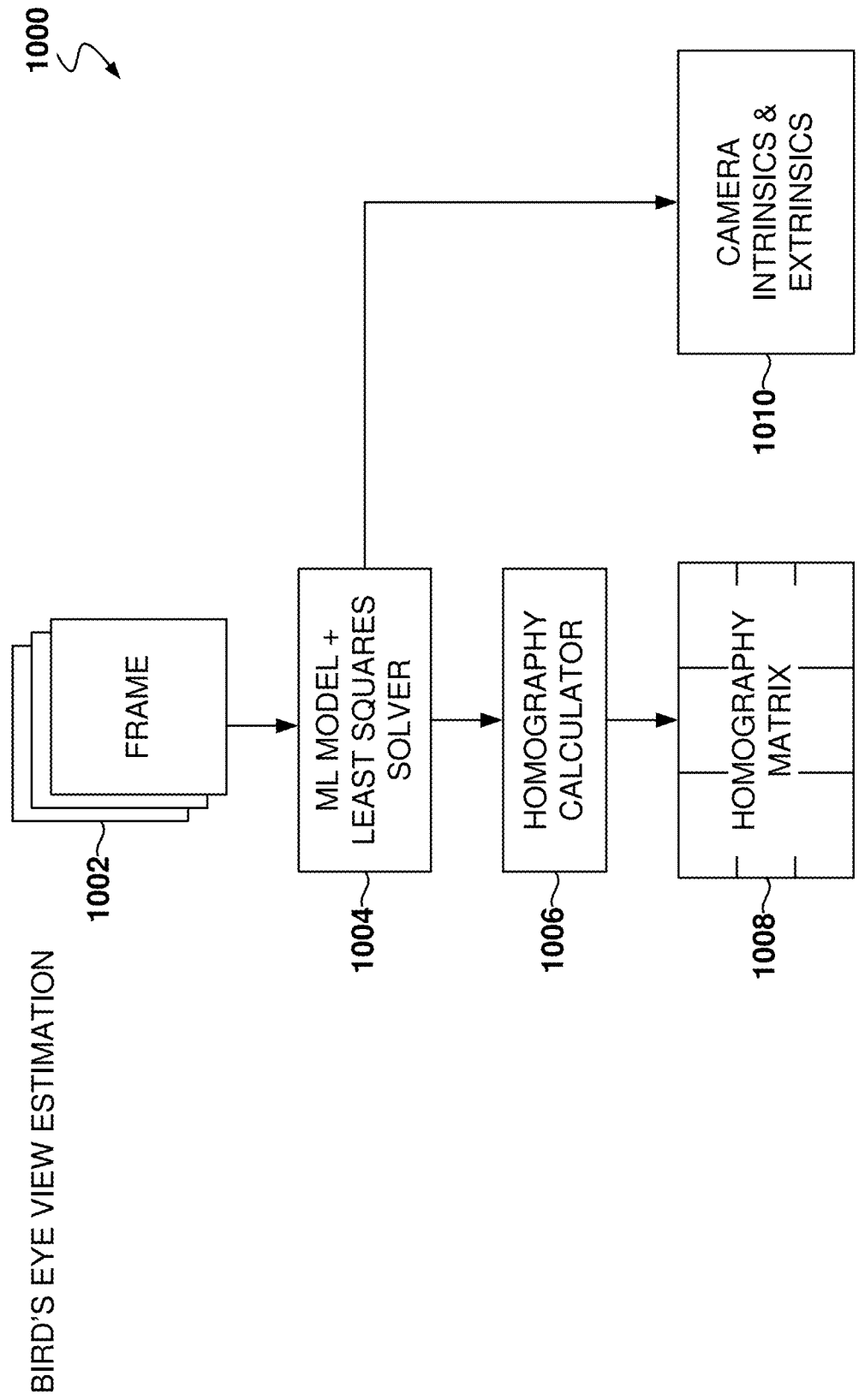
FIG. 10 is a flowchart of a method for bird's eye view estimation, according to some examples.

FIG. 10 is a flowchart of a method 1000 for bird's eye view estimation, according to some examples. While the various operations in this flowchart are presented and described sequentially, one of ordinary skill will appreciate that some or all of the operations may be executed in a different order, be combined or omitted, or be executed in parallel.

Inside the heuristics algorithm and the object tracking trajectory, there is also a model to help calculate the bird's eye view. A bird's eye view refers to a perspective that looks down upon an object, scene, or environment from above as if seen from the viewpoint of a bird in flight.

A bird's eye view transformation (also known as a top-down perspective transformation or inverse perspective mapping) is a mathematical process used in computer vision and image processing to convert an angled perspective of a scene into a top-down, orthogonal view. This transformation corrects the distortion caused by perspective projection and is used in autonomous driving, surveillance systems, augmented reality applications, etc.

The transformation is achieved using homography, which is a projective transformation that maps points from one plane to another. Given an original perspective image, the transformation uses a homography matrix (H) to warp the image into a new top-down perspective:

$$\begin{bmatrix} x' \\ y' \\ w' \end{bmatrix} = H \begin{bmatrix} x \\ y \\ w \end{bmatrix}$$

Where (x, y) are the original coordinates in the perspective image, (x', y') are the transformed coordinates in the bird's eye view, and H is a 3×3 homography matrix. The homography matrix H is a 3×3 transformation matrix used in projective geometry to map points from one plane to another in a perspective transformation. The H homography matrix is computed using correspondences between known real-world points and their positions in the image. Once the transformation is applied, the image appears as if it were captured from directly overhead.

The homography matrix H is defined as:

$$H = \begin{bmatrix} h_{11} h_{12} h_{13} \\ h_{21} h_{22} h_{23} \\ h_{31} h_{32} h_{33} \end{bmatrix}$$

Frames 1002 are used as input to the ML model+least squares solver 1004, where the captured frames 1002 are processed using a machine learning model combined with a least squares solver. This combination is used to analyze the frames 1002 and extract relevant data, such as camera parameters 1010, which include the camera intrinsics and extrinsics parameters, which include the internal and external parameters of the camera, such as focal length, roll, pitch, and yaw. These parameters are used to personalize the homography matrix 1008, ensuring accurate trajectory estimation and transformation consistency.

The output of the ML model+least squares solver 1004 is passed to the homography calculator 1006, which calculates the homography matrix 1008. The integration of the homography matrix 1008 with the camera's intrinsics and extrinsics parameters 1010 allows for the accurate conversion of image data into a bird's eye view, facilitating improved trajectory estimation and collision prediction in vehicle safety systems.

One example of the estimated parameters include the following values:

Roll: 3.2° (±1.2)°
Pitch: 0.9° (±1.6)°
vFoV: 55.3° (±23.9)°
Focal: 1031.2 px (±369.7 px)
K1: −0.1 2 3 4 5 6

The parameters are inputted into the homography calculator, which generates the homography matrix 1008. Here is an example of the homography matrix 1008:

$$H = \begin{bmatrix} 1.6561283e+00 & 1.1664354e+01 & -7.6984994e+03 \\ 7.0215042e-01 & 1.2512516e+01 & -8.2591169e+03 \\ 5.4328359e-05 & 9.6814652e-04 & -5.5924849e-01 \end{bmatrix}$$

In some examples, the calculation of the homography matrix requires a large amount of resources, so the calculation is performed on the server, and once the homography matrix is calculated, the homography matrix is downloaded to the AMS 210. The homography is calculated for every camera in the vehicle used for VRU detection. In other examples, the homography matrix is calculated by the AMS 210 in the vehicle.

Figure 11A:
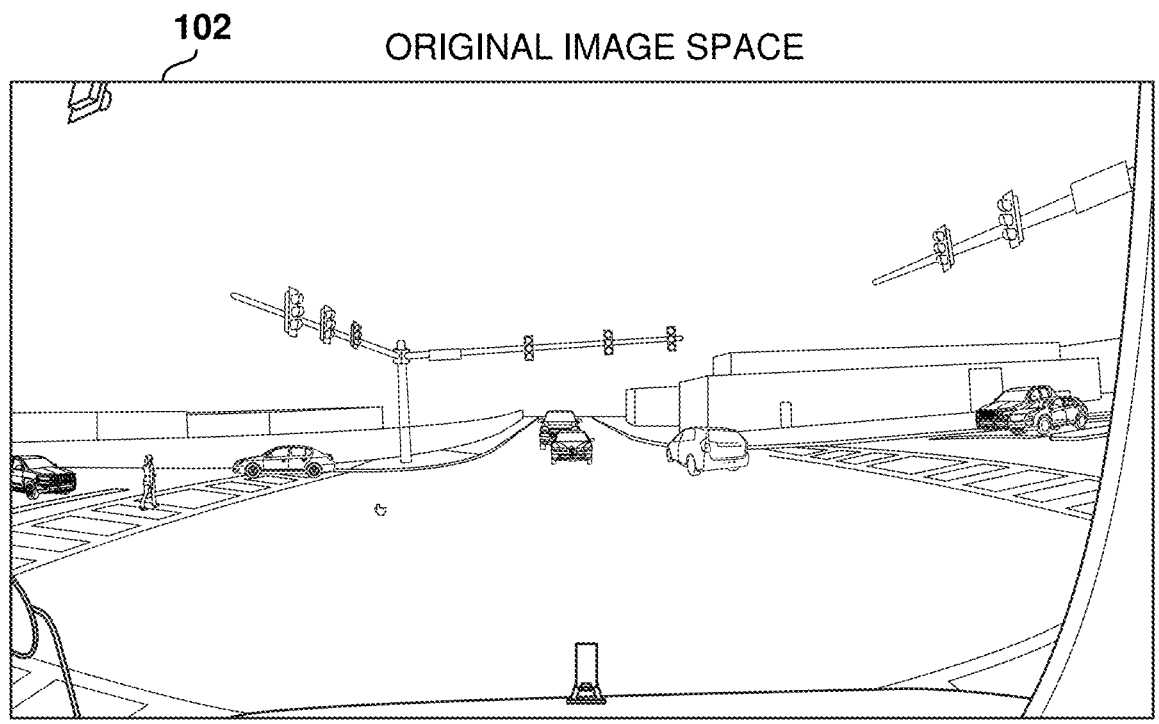
FIGS. 11A-11B show the bird's eye view for the image in FIG. 1A, according to some examples.
Figure 11B:
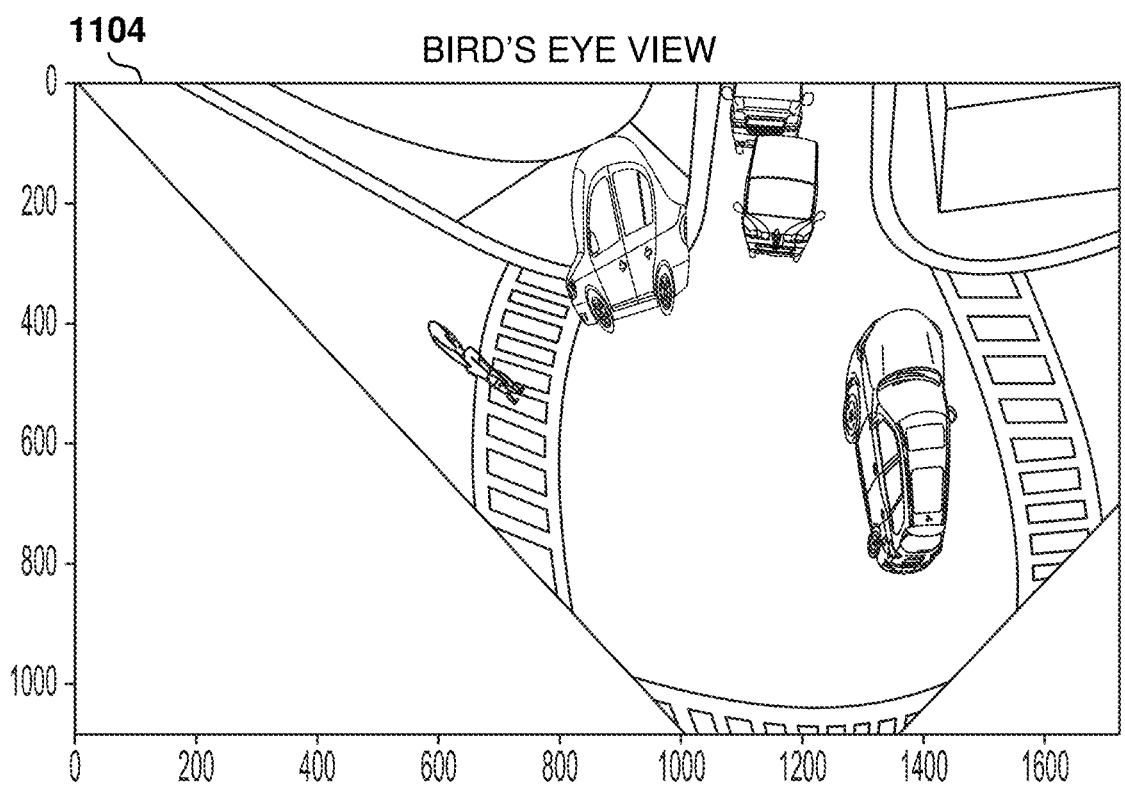

FIGS. 11A-11B show the bird's eye view for the image in FIG. 1A, according to some examples. FIG. 11A shows the image 102 From FIG. 1A. FIG. 11B shows a bird's eye view 1104, which is the result of transforming the image 102 using the homography matrix. Approximately, the bird's eye view 1104 is the result of rotating the camera as if the camera was aimed straight down on the scene. The bird's eye helps calculate trajectories in a linear manner instead of having to deal with perspective views.

The bird's eye view 1104 offers a comprehensive overview of the intersection, highlighting the spatial relationships between different objects, such as vehicles and pedestrians, in a manner that is not possible from the original perspective.

Figure 12:
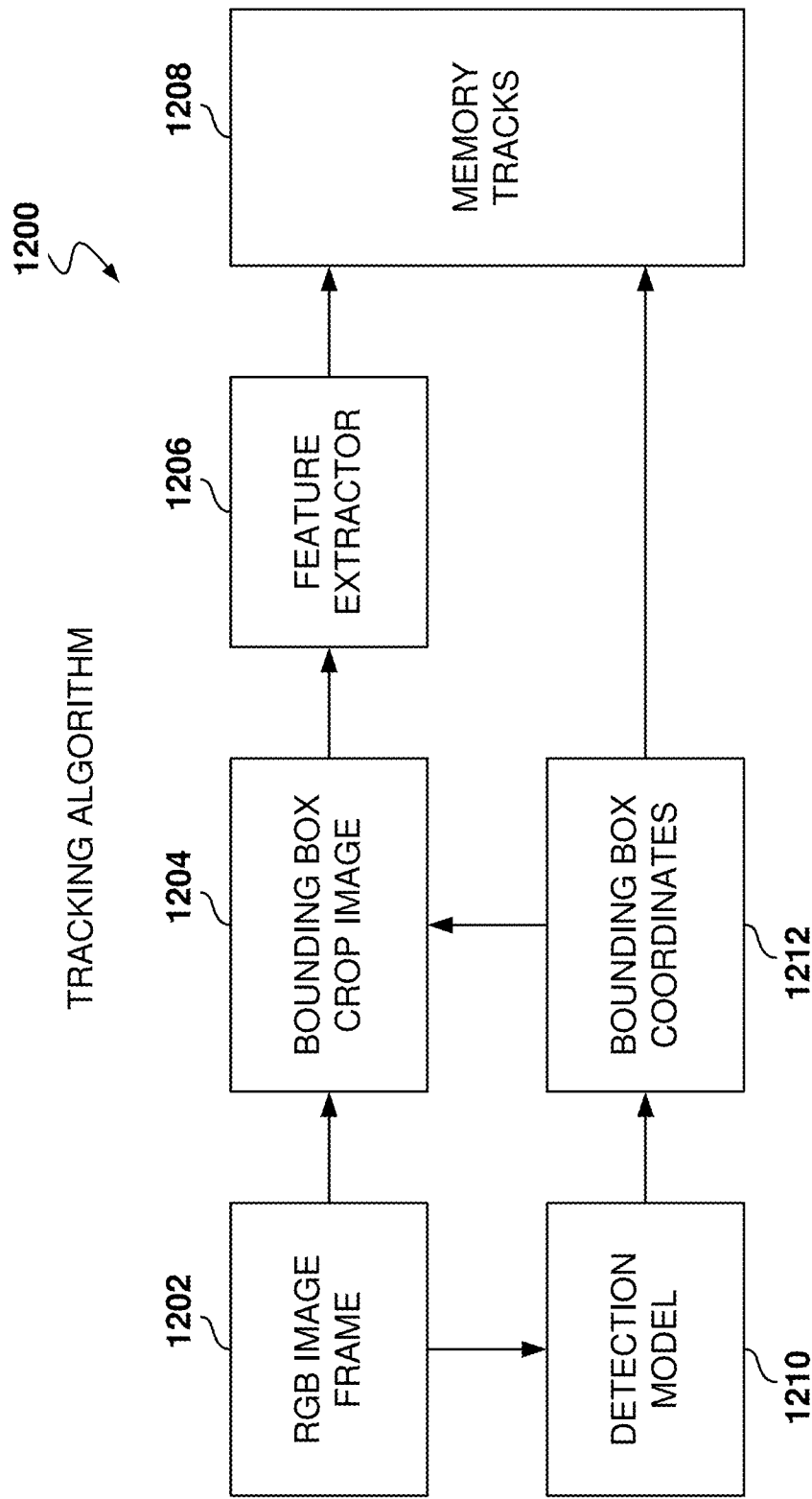
FIG. 12 is a flowchart of a method for object tracking, according to some examples.

FIG. 12 is a flowchart of a method 1200 for object tracking, according to some examples. While the various operations in this flowchart are presented and described sequentially, one of ordinary skill will appreciate that some or all of the operations may be executed in a different order, be combined or omitted, or be executed in parallel.

At operation 1202, an RGB image frame is captured. From operation 1202, the method flows to operation 1210, where the detection model processes the RGB image frame to generate outputs such as bounding box coordinates 1212.

From operation 1202, the method also flows to operation 1204, where a bounding box crop image is created. This operation utilizes the bounding box coordinates to crop specific regions of interest from the RGB image frame. The cropped images are used to isolate objects for detailed feature extraction.

At operation 1206, a feature extractor is applied to the bounding box crop image. This operation involves analyzing the cropped images to extract features that are used to track objects over time. In some examples, the feature extractor is a deep learning model or a traditional feature extraction method, such as the cv2 orb feature extractor.

Some of the features include calculating, for each bounding box, the distance with all the other previously tracked bounding boxes, The outputs of the feature extractor and the bounding box coordinates 1212 are stored as memory tracks 1208 for VRU detection. The memory tracks 1208 maintain a history of detected objects, allowing for continuous tracking and trajectory estimation.

For example, for frame number zero, all the bounding boxes are presented. Then, frame number one is provided. There is a mapping of which bounding boxes from framing number zero correspond to the bounding boxes of frame number one. This way, the trajectory of each bounding box is calculated based on the differences between frames and the time elapsed between frames. The objective is to construct a chronological sequence of these bounding boxes over time.

By analyzing the progression of the bounding boxes over time, the trajectory of the object is calculated, and the projected trajectory may also be calculated. In some examples, the trajectory is calculated using a weighted linear regression, but other trajectory calculation algorithms may be used.

In some examples, the coordinates of the object are calculated with reference to the vehicle position, but these coordinates may be transformed into geographic coordinates based on the location of the vehicle.

During the update phase, when the detection model performs inference, the same operations are performed as in the initialization phase to extract the current timestamps, bounding boxes, and features. Next, the latest bounding boxes and features from all the valid track objects are compared to the values stored in memory. In some examples, this matching process utilizes a distance function that combines the Intersection over Union (IOU) of the bounding boxes with the cosine distance between feature embeddings.

Further, a linear sum assignment is used to establish a matching matrix that aligns the data from the tracks with the new data from the current frame. Once the newly generated objects are matched with existing tracked objects, the object tracks are updated with this new information. Any detections that do not find corresponding matches to tracks are utilized to initialize new track objects. Further, when any track reaches a maximum age, the track is marked as invalid and removed from memory.

In some examples, when a track is updated and has at least two associated detections, a weighted least squares model is used to estimate the trajectory for the next bounding box within a predetermined amount of time. In this process, weights are assigned to the $x_{min}$, $y_{min}$, $x_{max}$, and $y_{max}$ coordinates of each track according to their arrival times, giving the least weight to the oldest bounding boxes and the most weight to the most recent ones. Subsequently, least squares is applied by calculating the pseudo-inverse to predict the coordinates at the new timestamp. A slope and intercept are calculated for each bounding box coordinate. These trajectories are stored for each track.

Here are some examples of the data calculated for each tracked object, although some implementations may use a subset or any combination of these values.

Figure 13A:
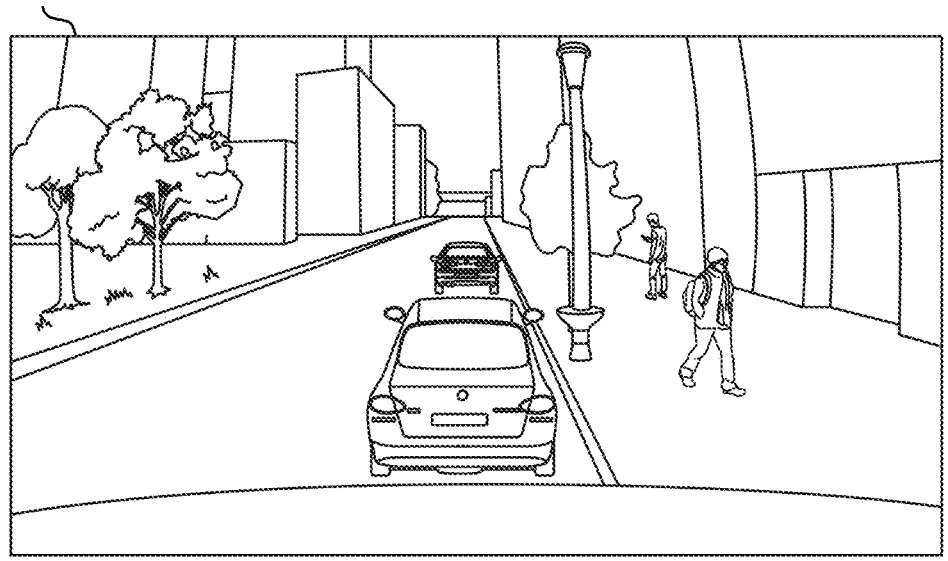
FIGS. 13A-13B show the detection of drivable areas, according to some examples.
Figure 13B:
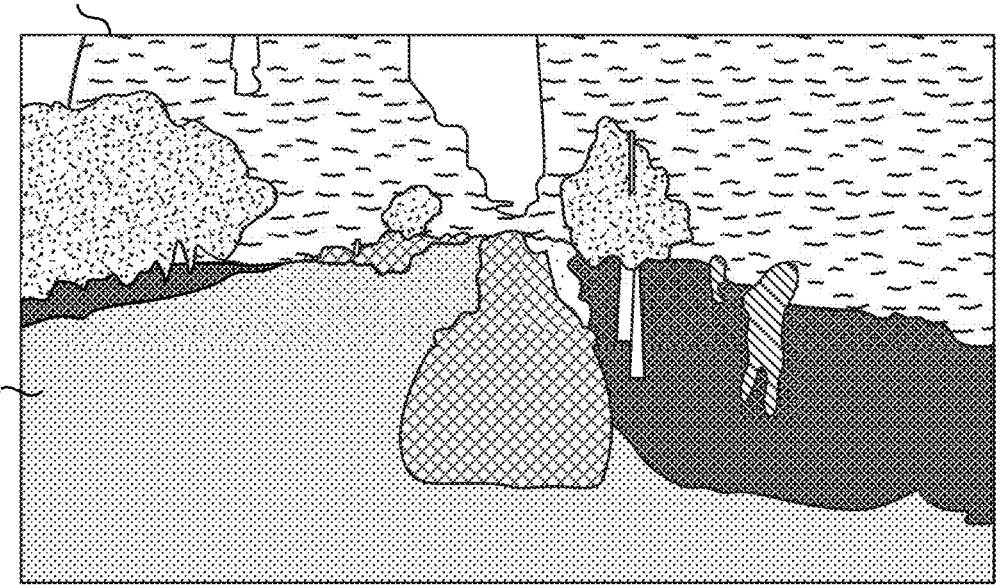

1. Timestamps
2. Object detection information
   a. Bounding Boxes
   b. Classes
   c. Confidences
   d. Depth data
3. Features
   a. Embedding vector from ORB (traditional feature extractors)
   b. Embedding vector from Tracking models (Deep learning)
4. Kalman Filter 5. Last Matched Timestamp
6. Trajectory coefficients
7. Age
8. Validity FIGS. 13A-13B show the detection of drivable areas, according to some examples. The first image 1302 is a photograph taken from the perspective of a vehicle, depicting an urban street scene. This image includes various elements such as vehicles, pedestrians, buildings, and trees, providing a real-world context for the vehicle's environment.

The second image 1304 presents a processed version of the first image, where the scene is segmented into drivable and non-drivable areas. The only drivable area is area 1306. In some examples, this segmentation is achieved by the ML model that classifies different regions of the image based on their potential for vehicle traversal. In this image, drivable areas, such as the road, are typically highlighted in a distinct color, while non-drivable areas, including sidewalks, buildings, and other obstacles, are marked in contrasting colors. This visual differentiation aids in the vehicle's navigation system by clearly delineating safe paths for travel and areas to avoid.

In some examples, a teacher model is trained with a plurality of images and the corresponding masks that determine whether an area is drivable or not. Based on this teacher model, the student model is able to generate the masks for the different drivable areas. Finding out whether the VRU is on the drivable area or not (e.g., the sidewalk) is determined based on the location of their bounding box with respect to the drivable area.

Some VRUs can reasonably be on the drivable area, such as a motorcycle. Therefore, the VRU event is not just based on being on the drivable area, but also on the trajectories of the ego vehicle and the VRU to determine if a collision is likely to occur.

Other solutions may focus on determining collision with the leading vehicle, that is, the vehicle ahead of the ego vehicle. However, VRU collision detection goes beyond detecting collision with what is ahead because the VRU collision takes into account the estimated trajectory of the VRU. For example, a VRU may be on an adjacent lane, and the ego vehicle may be changing lanes. Collision detection with the leading vehicle would not identify the potential collision, but VRU detection would create an alert if the trajectories are expected to collide.

Further, collision detection is based on a single vehicle ahead of the ego vehicle, while VRU detection keeps track of multiple objects that may be in the path of the ego vehicle, such as pedestrians crossing the street or drivers riding a scooter on the road.

In some examples, the teacher model is trained on a large-scale dataset for autonomous driving. The dataset includes the following semantic segmentation classes:
0. Road
1. Sidewalk
2. Building
3. Wall
4. Fence
5. Pole
6. Traffic Light
7. Traffic Sign
8. Vegetation
9. Terrain
10. Sky
11. Person
12. Rider
13. Car
14. Truck
15. Bus
16. Train
17. Motorcycle
18. Bicycle The input of the model is an image, and the output is one category value for each detected zone.

Figure 14:
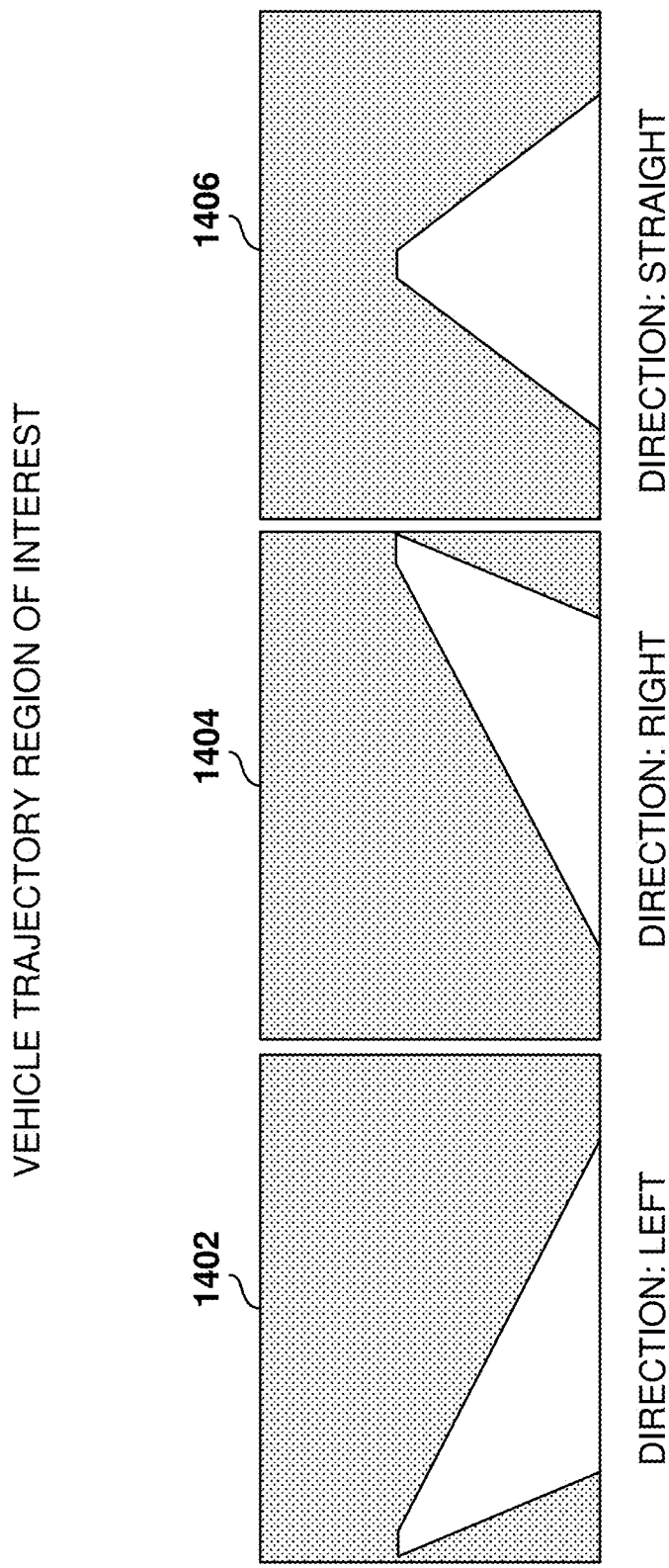
FIG. 14 illustrates the determination of the direction of the ego vehicle, according to some examples.

FIG. 14 illustrates the determination of the direction of the ego vehicle, according to some examples. The ego vehicle motion vector is used to determine the ROI (Region of Interest) of the vehicle trajectory. In some examples, three different ROIs are used as possible categories based on direction: left, right, and straight. Other examples may use additional categories to fine-tune the degree by which the ego vehicle is turning. The goal is to determine where the vehicle will be in the future, such as in a predetermined number of seconds.

The first option 1402 represents the vehicle trajectory when the vehicle is turning left. This configuration is designed to capture the vehicle's movement toward the left, providing a region of interest that extends from the bottom center of the image toward the left side.

The second option 1404 depicts the vehicle trajectory when the vehicle is turning right. This configuration extends the region of interest from the bottom center of the image towards the right. Further, the third option 1406 illustrates the vehicle trajectory when the vehicle is moving straight. In this scenario, the region of interest is centered and extends directly forward from the bottom center of the image.

The calculation involves ego vehicle motion estimation, which examines the difference between adjacent frames. In some examples, this evaluation is conducted periodically (e.g., five times per second). The computation of the difference between these frames is used to determine the vehicle's movement. The speed of the vehicle is also a factor for the estimation, and the speed is obtained from the data provided by the vehicle.

Figure 15:
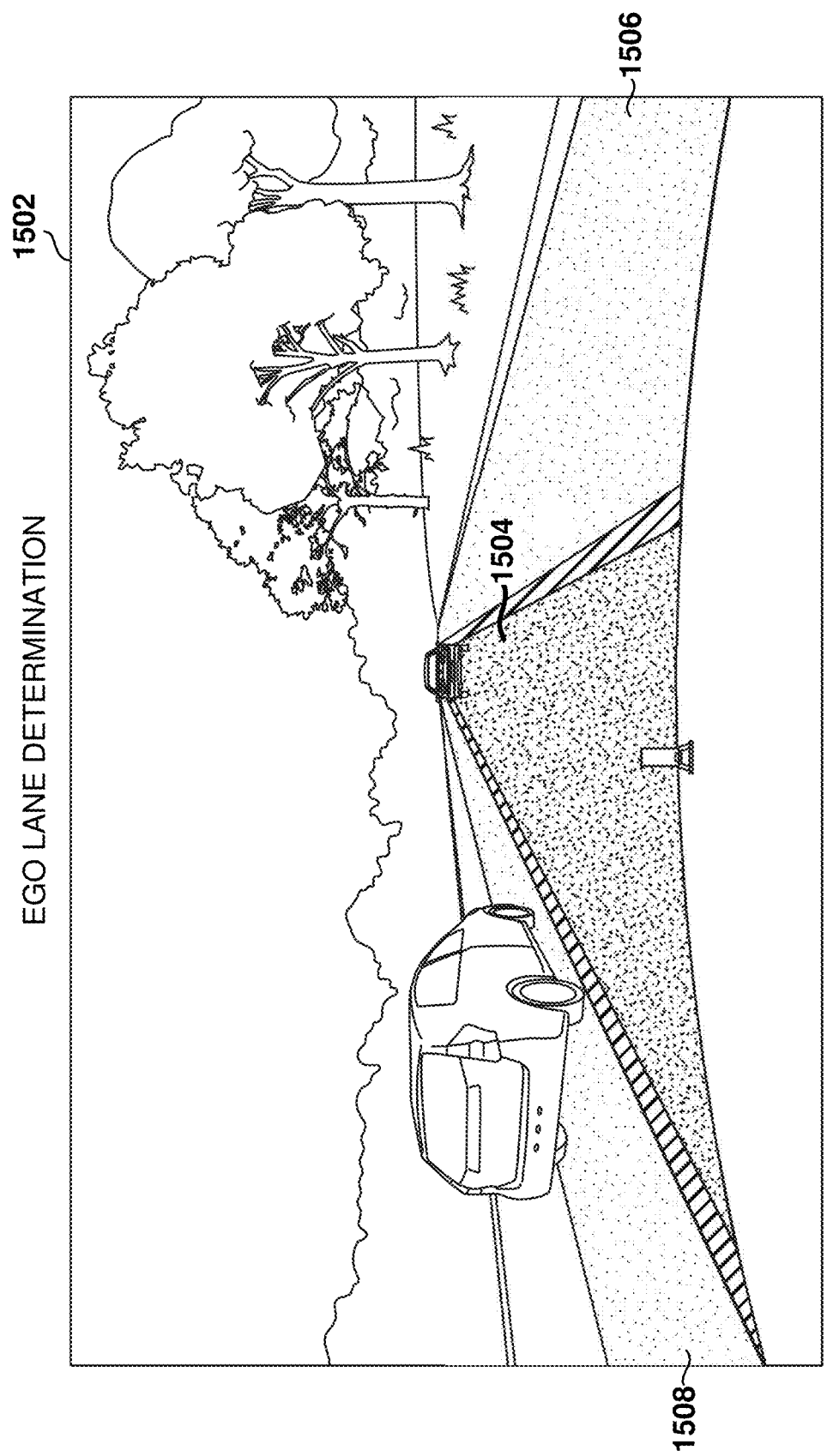
FIG. 15 shows an image with the estimated lane for the ego vehicle, according to some examples.

FIG. 15 shows an image 1502 with the estimated ego lane 1504 for the ego vehicle, according to some examples. The ego lane 1504 is the lane currently occupied by the vehicle. This lane is highlighted to provide a clear indication of the vehicle's path, ensuring that the system can accurately track the vehicle's position relative to the road infrastructure.

This information assists in identifying the location of individuals in relation to the ego vehicle. It provides additional context concerning drivable areas and includes a subclassification of these areas.

The model also identifies other lanes, like left lane 1508 and right lane 1506. Lanes in the opposite direction would be labeled as being in non-drivable areas.

Figure 16:
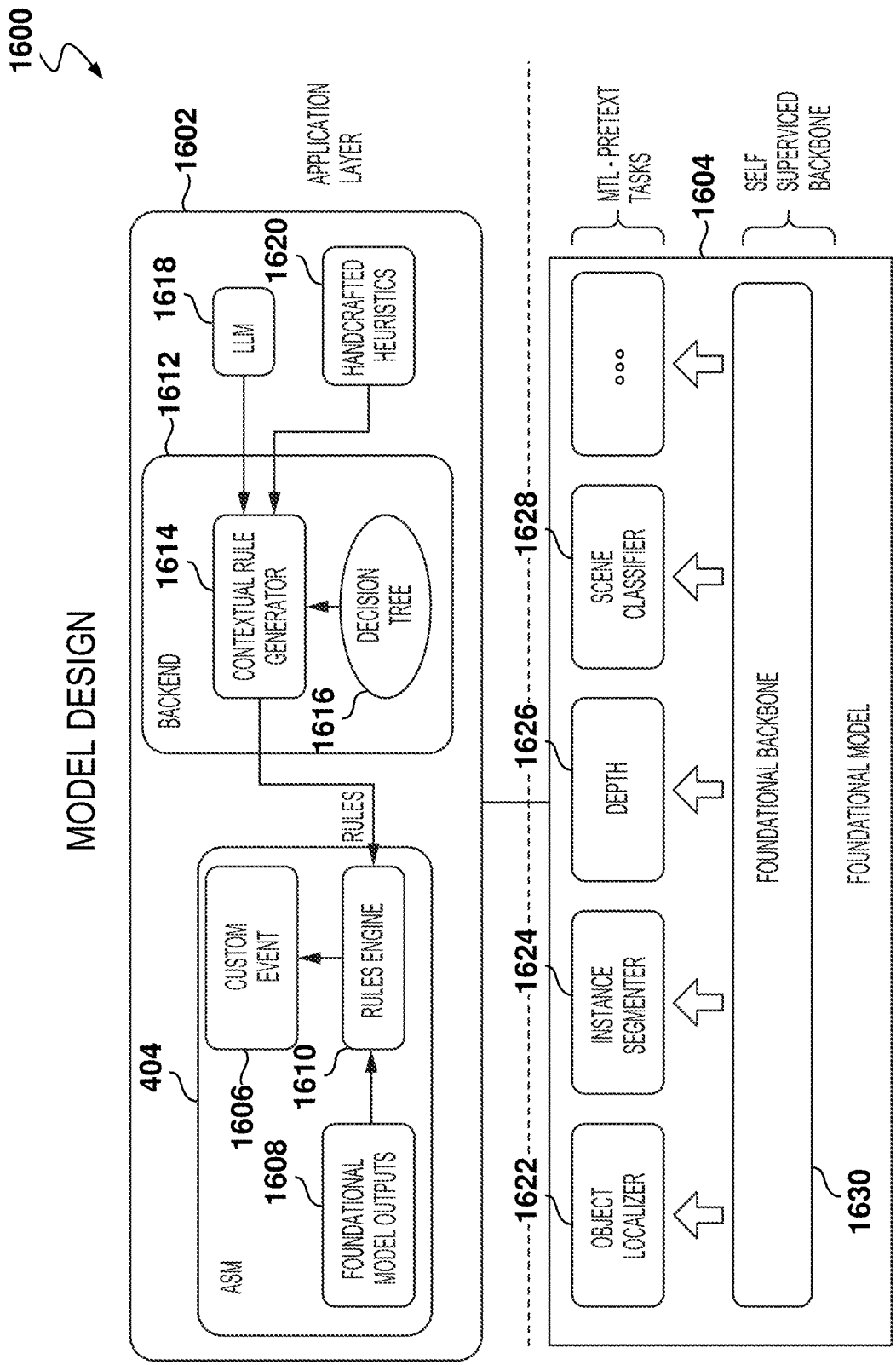
FIG. 16 illustrates a sample architecture of model design, according to some examples.

FIG. 16 illustrates a sample architecture 1600 of model design, according to some examples. The architecture 1600 includes the application layer 1602 and a foundational model 1604.

The application layer 1602 includes several components that work together to generate custom events 1606: the cam device 404, a backend 1612, a Large Language Model (LLM) 1618, and handcrafted heuristics 1620.

The cam device 404 includes the firmware with the foundational model outputs 1608 that interact with a rules engine 1610 that generates the custom events 1606. The backend 1612 includes the contextual rule generator 1614 dynamically generates rules based on a decision tree 1616, and the handcrafted heuristics 1620 to refine the rules based on the context provided by the LLM 1618. The LLM 1618 aids in the generation of rules by providing language-based insights.

The foundational model 1604 includes a foundational backbone 1630 that provides outputs necessary for further processing, including an object localizer 1622, an instance segmenter 1624, depth 1626, scene classifier 1628, etc. These components collaborate to analyze image data and offer detailed information about the environment, such as object locations, segmentation, depth estimation, and scene classification.

The principles described herein for VRU detection may be expanded to detect other types of events. For example, since the model determines the location of stop signs, the model may identify when the vehicle does not stop at a stop sign based on the rules configured for detection.

It is possible to generate a set of rules and create custom events. These events are not restricted to being VRU-related; any arbitrary event may be defined. For example, an event may be the detection of vehicles parked adjacent to a fire hydrant. The model is recognized to produce a fire hydrant as an output. This output can be applied to a rules engine, resulting in the generation of an event indicating that a vehicle has approached a fire hydrant or is parked next to it.

Rules may be generated using the handcrafted heuristics 1620. Users may request the LLM model to create rules for specific events, such as identifying situations where the vehicle has run over a red light. The rules can be transmitted to the ASM on the vehicle to start detection of the custom events.

Figure 17:
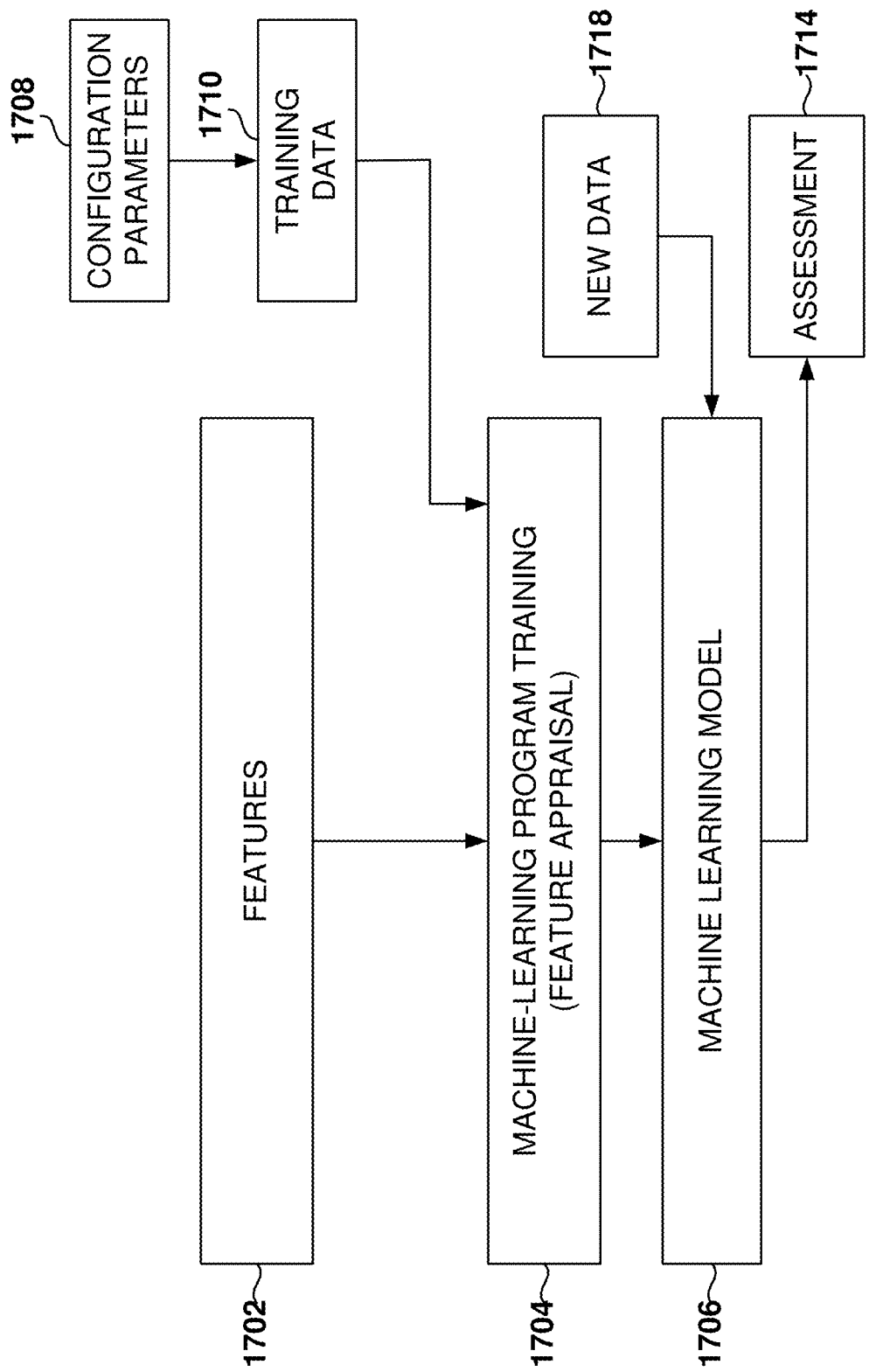
FIG. 17 illustrates the training and use of a machine-learning model, according to some example examples.

FIG. 17 illustrates the training and use of a machine-learning model 1706, according to some example examples. In some examples, machine learning (ML) models 1706 are utilized to perform operations associated with VRU collision detection.

Machine Learning (ML) is an application that provides computer systems the ability to perform tasks without explicitly being programmed by making inferences based on patterns found in the analysis of data. Machine learning explores the study and construction of algorithms, also referred to herein as tools, that may learn from existing data and make predictions about new data. Such machine-learning algorithms operate by building an ML model 1706 from training data 1710 in order to make data-driven predictions or decisions expressed as outputs or assessments 1714. Although examples are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm, using information that is neither classified nor labeled, and allowing the algorithm to act on that information without guidance. Unsupervised ML is useful in exploratory analysis because it can automatically identify structure in data.

Typical tasks for supervised ML are classification problems and regression problems. Classification problems, also referred to as categorization problems, aim to classify items into one of several category values (for example, is this object an apple or an orange?). Regression algorithms aim to quantify some items (for example, by providing a score to the value of some input). Some examples of commonly used supervised ML algorithms are Logistic Regression (LR), Naive-Bayes, Random Forest (RF), neural networks (NN), deep neural networks (DNN), matrix factorization, and Support Vector Machines (SVM).

In some examples, ML model 1706 provides data for VRU detection, such as VRU category, object bounding boxes, segmentation, drivable area, trajectory estimation, etc.

The training data 1710 comprises examples of values for the features 1702. In some examples, the training data comprises labeled data with examples of values for the features 1702 and labels indicating the outcome, such as the VRU event category. The machine-learning algorithms utilize the training data 1710 to find correlations among identified features 1702 that affect the outcome. A feature 1702 is an individual measurable property of a phenomenon being observed. The concept of a feature is related to that of an explanatory variable used in statistical techniques such as linear regression. Choosing informative, discriminating, and independent features is essential for the effective operation of ML in pattern recognition, classification, and regression. Features may be of different types, such as numeric, strings, categorical, and graph. A categorical feature is a feature that may be assigned a value from a plurality of predetermined possible values (e.g., this animal is a dog, a cat, or a bird).

During training 1704, the ML program, also referred to as ML algorithm or ML tool, analyzes the training data 1710 based on identified features 1702 and configuration parameters 1708 defined for the training. The result of the training 1704 is the ML model 1706, which is capable of taking inputs to produce assessments.

Training an ML algorithm involves analyzing large amounts of data (e.g., from several gigabytes to a terabyte or more) in order to find data correlations. The ML algorithms utilize the training data 1710 to find correlations among the identified features 1702 that affect the outcome or assessment 1714. In some examples, the training data 1710 includes labeled data, which is known data for one or more identified features 1702 and one or more outcomes.

The ML algorithms usually explore many possible functions and parameters before finding what the ML algorithms identify to be the best correlations within the data; therefore, training may make use of large amounts of computing resources and time.

Many ML algorithms include configuration parameters 1708, and the more complex the ML algorithm, the more parameters there are that are available to the user. The configuration parameters 1708 define variables for an ML algorithm in the search for the best ML model. The training parameters include model parameters and hyperparameters. Model parameters are learned from the training data, whereas hyperparameters are not learned from the training data but are instead provided to the ML algorithm.

When the ML model 1706 is used to perform an assessment, new data 1718 (e.g., an image frame or a sequence of image frames) is provided as input to the ML model 1706, and the ML model 1706 generates the assessment 1714 as output.

In some examples, results obtained by the model 1706 during operation (e.g., assessment 1714 produced by the model in response to inputs) are used to improve the training data 1710, which is then used to generate a newer version of the model. Thus, a feedback loop is formed to use the results obtained by the model to improve the model.

Figure 18:
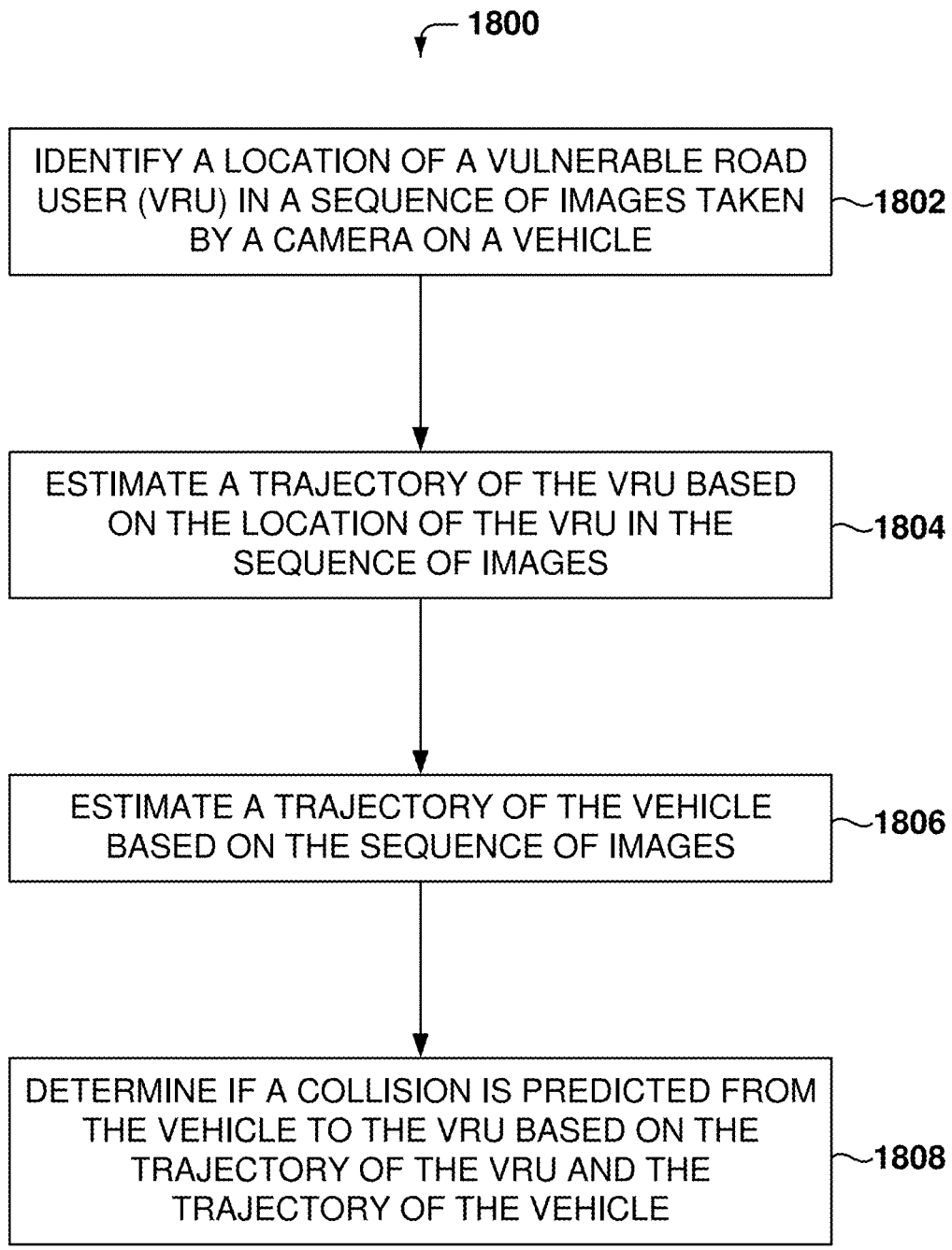
FIG. 18 is a flowchart of a method for detecting potential collisions of vehicles with a Vulnerable Road User (VRU), according to some examples.

FIG. 18 is a flowchart of a method 1800 for detecting potential collisions of vehicles with a Vulnerable Road User (VRU), according to some examples. While the various operations in this flowchart are presented and described sequentially, one of ordinary skill will appreciate that some or all of the operations may be executed in a different order, be combined or omitted, or be executed in parallel.

Operation 1802 includes identifying a location of the VRU in a sequence of images taken by a camera on a vehicle. This operation utilizes image processing techniques to detect VRUs such as pedestrians, cyclists, or individuals using mobility devices. In some examples, a machine learning model trained to recognize VRUs is employed to generate bounding boxes around detected VRUs in the images, providing precise location data.

From operation 1802, the method 1800 flows to operation 1804, where a trajectory of the VRU is estimated based on the location of the VRU in the sequence of images. This involves analyzing the movement of the VRU across multiple frames to predict the future path of the VRU.

From operation 1804, the method 1800 flows to operation 1806, where a trajectory of the vehicle is estimated based on the sequence of images. This operation involves determining the vehicle's path by analyzing the movement of the vehicle across the image frames.

From operation 1806, the method 1800 flows to operation 1808, where a determination is made regarding the prediction of a collision between the vehicle and the VRU based on the trajectory of the VRU and the trajectory of the vehicle. This operation involves comparing the predicted paths of the VRU and the vehicle to assess the likelihood of a collision.

Another general aspect is for a system that includes a memory comprising instructions and one or more computer processors. The instructions, when executed by the one or more computer processors, cause the one or more computer processors to perform operations comprising: identifying a location of a vulnerable road user (VRU) in a sequence of images taken by a camera on a vehicle; estimating a trajectory of the VRU based on the location of the VRU in the sequence of images; estimating a trajectory of the vehicle based on the sequence of images; and determining if a collision is predicted from the vehicle to the VRU based on the trajectory of the VRU and the trajectory of the vehicle.

In yet another general aspect, a tangible machine-readable storage medium (e.g., a non-transitory storage medium) includes instructions that, when executed by a machine, cause the machine to perform operations comprising: identifying a location of a vulnerable road user (VRU) in a sequence of images taken by a camera on a vehicle; estimating a trajectory of the VRU based on the location of the VRU in the sequence of images; estimating a trajectory of the vehicle based on the sequence of images; and determining if a collision is predicted from the vehicle to the VRU based on the trajectory of the VRU and the trajectory of the vehicle.

In view of the disclosure above, various examples are set forth below. It should be noted that one or more features of an example, taken in isolation or combination, should be considered within the disclosure of this application.

Example 1. A computer-implemented method comprising: identifying a location of a vulnerable road user (VRU) in a sequence of images taken by a camera on a vehicle; estimating a trajectory of the VRU based on the location of the VRU in the sequence of images; estimating a trajectory of the vehicle based on the sequence of images; and determining if a collision is predicted from the vehicle to the VRU based on the trajectory of the VRU and the trajectory of the vehicle.

Example 2. The method of Example 1, wherein identifying the location of the VRU further comprises: using a machine learning (ML) model trained to detect the VRU based on an input image, the ML model generating as output a bounding box of the VRU in the input image.

Example 3. The method of any one or more of Examples 1-2, wherein the ML model assigns confidence scores to each detected VRU indicating a likelihood of accurate detection.

Example 4. The method of any one or more of Examples 1-3, wherein estimating the trajectory of the vehicle further comprises: determining a direction of the vehicle associated with a most recent image.

Example 5. The method of any one or more of Examples 1-4, wherein estimating the trajectory of the VRU further comprises: transforming the image to a bird's eye view using a homography matrix for the camera in the vehicle; and estimating the trajectory of the VRU based on a sequence of bird's eye views.

Example 6. The method of any one or more of Examples 1-5, further comprising: overlaying segmentation masks onto a global depth mask to determine object depth within the image.

Example 7. The method of any one or more of Examples 1-6, wherein determining if the collision is predicted further comprises: calculating a severity score for a probability of collision based on object depth, position, and motion state.

Example 8. The method of any one or more of Examples 1-7, wherein determining if the collision is predicted further comprises: detecting a possible collision in a predetermined minimum number of consecutive images in the sequence of images; and generating an alert based on the possible collision being detected in the predetermined minimum number of consecutive images.

Example 9. The method of any one or more of Examples 1-8, wherein tracked VRUs comprise pedestrians, cyclists, motorcyclists, users of mobility devices, and animal-related users.

Example 10. The method of any one or more of Examples 1-9, wherein the sequence of images is sampled from a video at a predefined sampling rate.

Example 11. A system comprising: a memory comprising instructions; and one or more computer processors, the instructions, when executed by the one or more computer processors, causing the system to perform operations comprising: identifying a location of a vulnerable road user (VRU) in a sequence of images taken by a camera on a vehicle; estimating a trajectory of the VRU based on the location of the VRU in the sequence of images; estimating a trajectory of the vehicle based on the sequence of images; and determining if a collision is predicted from the vehicle to the VRU based on the trajectory of the VRU and the trajectory of the vehicle.

Example 12. The system of Example 11, wherein identifying the location of the VRU further comprises: using a machine learning (ML) model trained to detect the VRU based on an input image, the ML model generating as output a bounding box of the VRU in the input image.

Example 13. The system of any one or more of Examples 11-12, wherein the ML model assigns confidence scores to each detected VRU indicating a likelihood of accurate detection.

Example 14. The system of any one or more of Examples 11-13, wherein estimating the trajectory of the vehicle further comprises: determining a direction of the vehicle associated with a most recent image.

Example 15. The system of any one or more of Examples 11-14, wherein estimating the trajectory of the VRU further comprises: transforming the image to a bird's eye view using a homography matrix for the camera in the vehicle; and estimating the trajectory of the VRU based on a sequence of bird's eye views.

Example 16. A non-transitory machine-readable storage medium including instructions that, when executed by a machine, cause the machine to perform operations comprising: identifying a location of a vulnerable road user (VRU) in a sequence of images taken by a camera on a vehicle; estimating a trajectory of the VRU based on the location of the VRU in the sequence of images; estimating a trajectory of the vehicle based on the sequence of images; and determining if a collision is predicted from the vehicle to the VRU based on the trajectory of the VRU and the trajectory of the vehicle.

Example 17. The non-transitory machine-readable storage medium of Example 16, wherein identifying the location of the VRU further comprises: using a machine learning (ML) model trained to detect the VRU based on an input image, the ML model generating as output a bounding box of the VRU in the input image.

Example 18. The non-transitory machine-readable storage medium of any one or more of Examples 16-17, wherein the ML model assigns confidence scores to each detected VRU indicating a likelihood of accurate detection.

Example 19. The non-transitory machine-readable storage medium of any one or more of Examples 16-18, wherein estimating the trajectory of the vehicle further comprises: determining a direction of the vehicle associated with a most recent image.

Example 20. The non-transitory machine-readable storage medium of any one or more of Examples 16-19, wherein estimating the trajectory of the VRU further comprises: transforming the image to a bird's eye view using a homography matrix for the camera in the vehicle; and estimating the trajectory of the VRU based on a sequence of bird's eye views.

Figure 19:
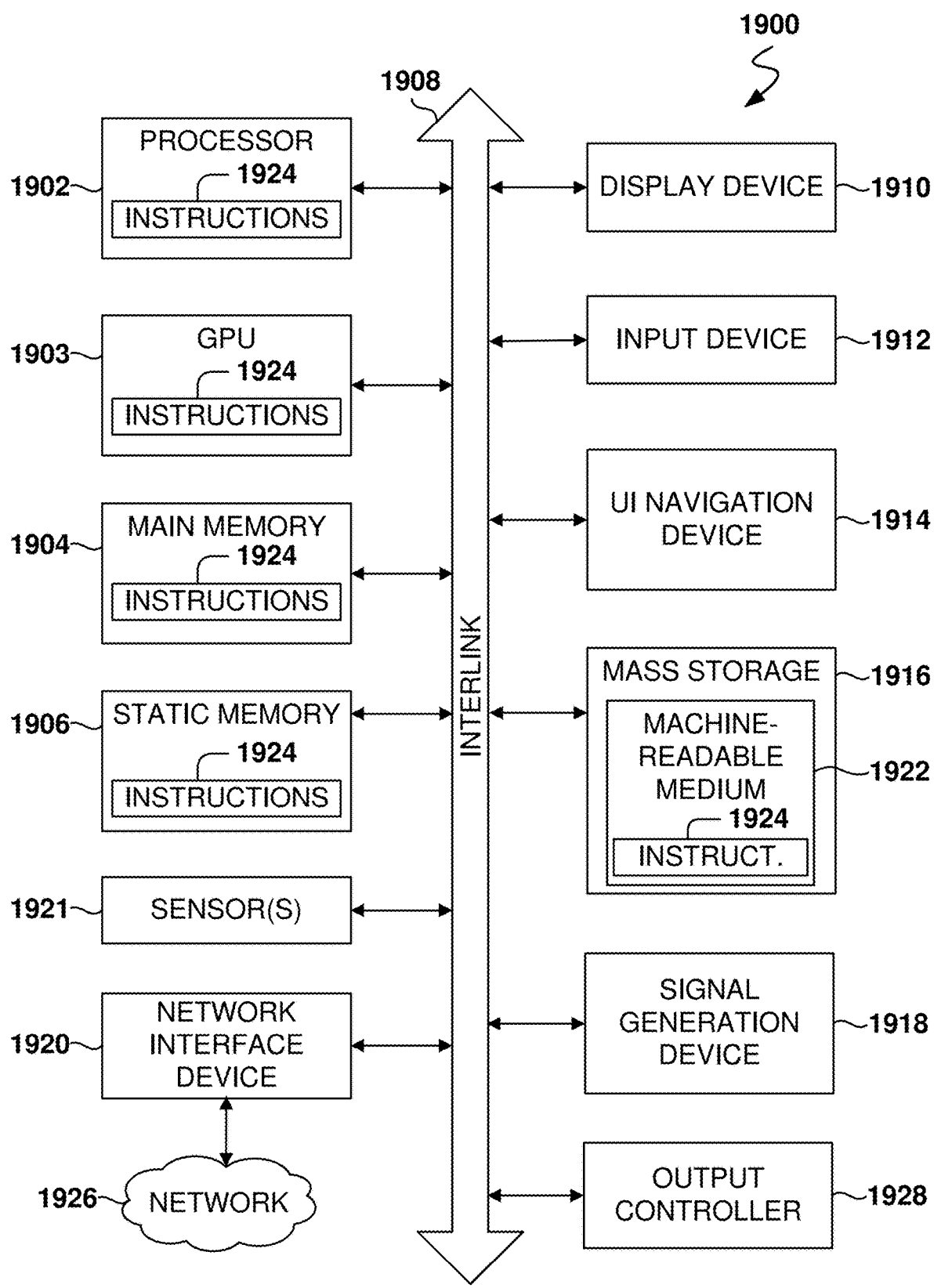
FIG. 19 is a block diagram illustrating an example of a machine upon or by which one or more process examples described herein may be implemented or controlled.

FIG. 19 is a block diagram illustrating an example of a machine 1900 upon or by which one or more process examples described herein may be implemented or controlled. In alternative examples, the machine 1900 may operate as a standalone device or be connected (e.g., networked) to other machines. In a networked deployment, the machine 1900 may operate in the capacity of a server machine, a client machine, or both in server-client network environments. In an example, the machine 1900 may act as a peer machine in a peer-to-peer (P2P) (or other distributed) network environment. Further, while only a single machine 1900 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as recited herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1900 (e.g., computer system) may include a hardware processor 1902 (e.g., a central processing unit (CPU), a hardware processor core, or any combination thereof), a graphics processing unit (GPU 1903), a main memory 1904, and a static memory 1906, some or all of which may communicate with each other via an interlink 1908 (e.g., bus). The machine 1900 may further include a display device 1910, an alphanumeric input device 1912 (e.g., a keyboard), and a user interface (UI) navigation device 1914 (e.g., a mouse). In an example, the display device 1910, alphanumeric input device 1912, and UI navigation device 1914 may be a touch screen display. The machine 1900 may additionally include a mass storage device 1916 (e.g., drive unit), a signal generation device 1918 (e.g., a speaker), a network interface device 1920, and one or more sensors 1921, such as a Global Positioning System (GPS) sensor, compass, accelerometer, or another sensor. The machine 1900 may include an output controller 1928, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1902 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1902 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1902 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1902 may be emulated in software, running on a physical processor, as a virtual processor or virtual circuit. The virtual processor may behave like an independent processor but is implemented in software rather than hardware.

The mass storage device 1916 may include a machine-readable medium 1922 on which one or more sets of data structures or instructions 1924 (e.g., software) embodying or utilized by any of the techniques or functions described herein. The instructions 1924 may also reside, completely or at least partially, within the main memory 1904, within the static memory 1906, within the hardware processor 1902, or the GPU 1903 during execution thereof by the machine 1900. For example, one or any combination of the hardware processor 1902, the GPU 1903, the main memory 1904, the static memory 1906, or the mass storage device 1916 may constitute machine-readable media.

While the machine-readable medium 1922 is illustrated as a single medium, the term "machine-readable medium" may include a single medium or multiple media (e.g., a centralized or distributed database and associated caches and servers) configured to store one or more instructions 1924.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The term "machine-readable medium" may include any medium that is capable of storing, encoding, or carrying instructions 1924 for execution by the machine 1900 and that causes the machine 1900 to perform any one or more of the techniques of the present disclosure or that is capable of storing, encoding, or carrying data structures used by or associated with such instructions 1924. Non-limiting machine-readable medium examples may include solid-state memories and optical and magnetic media. For example, a massed machine-readable medium comprises a machine-readable medium 1922 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media.

The instructions 1924 may be transmitted or received over a communications network 1926 using a transmission medium via the network interface device 1920. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1924 for execution by the machine 1900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:
identifying a location of a vulnerable road user (VRU) in a sequence of images taken by a camera on a vehicle;
estimating a trajectory of the VRU based on the location of the VRU in the sequence of images, wherein estimating the trajectory of the VRU further comprises:
transforming each image from the sequence of images to a bird's eye view using a homography matrix associated with the camera in the vehicle; and
estimating the trajectory of the VRU based on a sequence of bird's eye views;
estimating a trajectory of the vehicle based on the sequence of images; and
determining if a collision is predicted from the vehicle to the VRU based on the trajectory of the VRU and the trajectory of the vehicle.

2. The method as recited in claim 1, wherein identifying the location of the VRU further comprises:
using a machine learning (ML) model trained to detect the VRU based on an input image, the ML model generating as output a bounding box of the VRU in the input image.

3. The method as recited in claim 2, wherein the ML model assigns confidence scores to each detected VRU indicating a likelihood of accurate detection.

4. The method as recited in claim 1, wherein estimating the trajectory of the vehicle further comprises:
determining a direction of the vehicle associated with a most recent image.

5. The method of claim 1, further comprising:
calculating the homography matrix based on correspondences between known real-world points and positions of the known real-world points in the images, wherein the homography matrix is a transformation matrix that maps points from an image with an original perspective to a top-down orthogonal view.

6. The method of claim 5, wherein the calculation of the homography matrix for the camera installed in the vehicle is performed on a remote server, which is downloaded from the remote server to an asset monitoring system in the vehicle.

7. The method of claim 1, further comprising:
extracting, by an ML model combined with a least squares solver, camera parameters of the camera installed in the vehicle based on frames captured by the camera, the camera parameters comprising focal length, roll, pitch, and yaw; and
customizing the homography matrix for the camera installed in the vehicle based on the camera parameters.

8. The method as recited in claim 1, further comprising:
overlaying segmentation masks onto a global depth mask to determine object depth within the image.

9. The method as recited in claim 1, wherein determining if the collision is predicted further comprises:
calculating a severity score for a probability of collision based on object depth, position, and motion state.

10. The method as recited in claim 1, wherein determining if the collision is predicted further comprises:
detecting a possible collision in a predetermined minimum number of consecutive images in the sequence of images; and
generating an alert based on the possible collision being detected in the predetermined minimum number of consecutive images.

11. The method as recited in claim 1, wherein tracked VRUs comprise pedestrians, cyclists, motorcyclists, users of mobility devices, and animal-related users.

12. The method as recited in claim 1, wherein the sequence of images is sampled from a video at a predefined sampling rate.

13. A system comprising:
a memory comprising instructions; and
one or more computer processors, the instructions, when executed by the one or more computer processors, causing the system to perform operations comprising:
identifying a location of a vulnerable road user (VRU) in a sequence of images taken by a camera on a vehicle;
estimating a trajectory of the VRU based on the location of the VRU in the sequence of images, wherein estimating the trajectory of the VRU further comprises:
transforming each image from the sequence of images to a bird's eye view using a homography matrix associated with the camera in the vehicle; and
estimating the trajectory of the VRU based on a sequence of bird's eye views;
estimating a trajectory of the vehicle based on the sequence of images; and
determining if a collision is predicted from the vehicle to the VRU based on the trajectory of the VRU and the trajectory of the vehicle.

14. The system as recited in claim 13, wherein identifying the location of the VRU further comprises:
using a machine learning (ML) model trained to detect the VRU based on an input image, the ML model generating as output a bounding box of the VRU in the input image.

15. The system as recited in claim 14, wherein the ML model assigns confidence scores to each detected VRU indicating a likelihood of accurate detection.

16. The system as recited in claim 13, wherein estimating the trajectory of the vehicle further comprises:
determining a direction of the vehicle associated with a most recent image.

17. A non-transitory machine-readable storage medium including instructions that, when executed by a machine, cause the machine to perform operations comprising:
identifying a location of a vulnerable road user (VRU) in a sequence of images taken by a camera on a vehicle;
estimating a trajectory of the VRU based on the location of the VRU in the sequence of images, wherein estimating the trajectory of the VRU further comprises:
transforming each image from the sequence of images to a bird's eye view using a homography matrix associated with the camera in the vehicle; and
estimating the trajectory of the VRU based on a sequence of bird's eye views;

estimating a trajectory of the vehicle based on the sequence of images; and determining if a collision is predicted from the vehicle to the VRU based on the trajectory of the VRU and the trajectory of the vehicle.

18. The non-transitory machine-readable storage medium as recited in claim 17, wherein identifying the location of the VRU further comprises:

using a machine learning (ML) model trained to detect the VRU based on an input image, the ML model generating as output a bounding box of the VRU in the input image.

19. The non-transitory machine-readable storage medium as recited in claim 18, wherein the ML model assigns confidence scores to each detected VRU indicating a likelihood of accurate detection.

20. The non-transitory machine-readable storage medium as recited in claim 17, wherein estimating the trajectory of the vehicle further comprises:

determining a direction of the vehicle associated with a most recent image.

\* \* \* \* \*